United States Patent [19]

Honjo

[11] Patent Number: 4,672,280

[45] Date of Patent: Jun. 9, 1987

[54] MOBILE ROBOT CALLING SYSTEM

[75] Inventor: Yoshiaki Honjo, Musashimurayama, Japan

[73] Assignee: Casio Computer Co., Ltd., Tokyo, Japan

[21] Appl. No.: 682,800

[22] Filed: Dec. 18, 1984

[30] Foreign Application Priority Data

Dec. 27, 1983 [JP] Japan .............................. 58-246406
Dec. 27, 1983 [JP] Japan .............................. 58-246408
Mar. 27, 1984 [JP] Japan .............................. 59-58931

[51] Int. Cl.$^4$ ...................... G05D 1/00; G06F 15/20; H02J 1/00; B65G 47/00

[52] U.S. Cl. ..................................... 318/587; 318/16; 364/424; 364/478; 340/310 R; 307/1; 198/358; 414/227

[58] Field of Search ................. 318/587, 16, 606, 607, 318/562; 364/424, 478; 307/140, 2, 1; 340/310 A, 310 CP, 310 R, 991, 993, 998, 999; 180/167, 168; 414/227, 231, 234, 252, 253, 265, 349, 274, 279, 572, 909; 198/341, 358, 348

[56] References Cited

U.S. PATENT DOCUMENTS

| | | | |
|---|---|---|---|
| 3,467,835 | 9/1969 | Cola ................. | 307/140 X |
| 3,641,326 | 2/1972 | Harte ................ | 318/562 X |
| 3,720,281 | 3/1973 | Flownfelter .......... | 318/587 X |
| 3,768,586 | 10/1973 | Thompson ........... | 318/587 X |
| 3,909,618 | 9/1975 | Fujii ................ | 340/310 R X |
| 4,010,409 | 3/1977 | Waites ............... | 318/587 |
| 4,038,590 | 7/1977 | Knowlton ............ | 318/562 |
| 4,047,003 | 9/1977 | La Rocca ............ | 318/562 X |
| 4,053,741 | 10/1977 | Ainoya .............. | 198/358 |
| 4,174,517 | 11/1979 | Mandel .............. | 307/140 X |
| 4,215,759 | 8/1980 | Diaz ................. | 318/587 X |
| 4,329,678 | 5/1982 | Hatfield ............. | 307/140 X |
| 4,334,221 | 6/1982 | Rosenhagen .......... | 180/167 X |
| 4,348,582 | 9/1982 | Budek ............... | 307/140 X |
| 4,456,869 | 6/1984 | Schub ............... | 307/140 X |
| 4,517,548 | 5/1985 | Ise .................. | 340/310 R |
| 4,561,060 | 12/1985 | Hemond ............. | 364/478 |

FOREIGN PATENT DOCUMENTS

0016020 1/1984 Japan .............................. 180/168

OTHER PUBLICATIONS

Proceedings of the 2nd International Conference on Automated Guided Vehicle Systems and 16th IPA Conference, Stutgart, June 7–9, 1983, pp. 195–209.

*Primary Examiner*—William M. Shoop, Jr.
*Assistant Examiner*—Patrick C. Keane
*Attorney, Agent, or Firm*—Frishauf, Holtz, Goodman & Woodward

[57] ABSTRACT

A mobile robot calling system has a mobile robot normally waiting at a home position and connected to an AC power supply such that its battery is charged by the AC power supply in the wait status, and a calling oscillator for generating a calling signal to the mobile robot. The calling signal is supplied from the calling oscillator to the mobile robot through indoor AC power supply wiring. Relay transmitters are respectively arranged for a plurality of AC receptacles to relay the calling signal. A controller is arranged to control a plurality of calling devices and robot waiting stations. The controller cyclically checks the robot calling states of the calling devices and robot wait status in the waiting stations. The controller generates a robot calling command to the waiting stations in accordance with the robot wait status in the waiting stations when the robot calling signals are generated from the calling devices.

12 Claims, 33 Drawing Figures

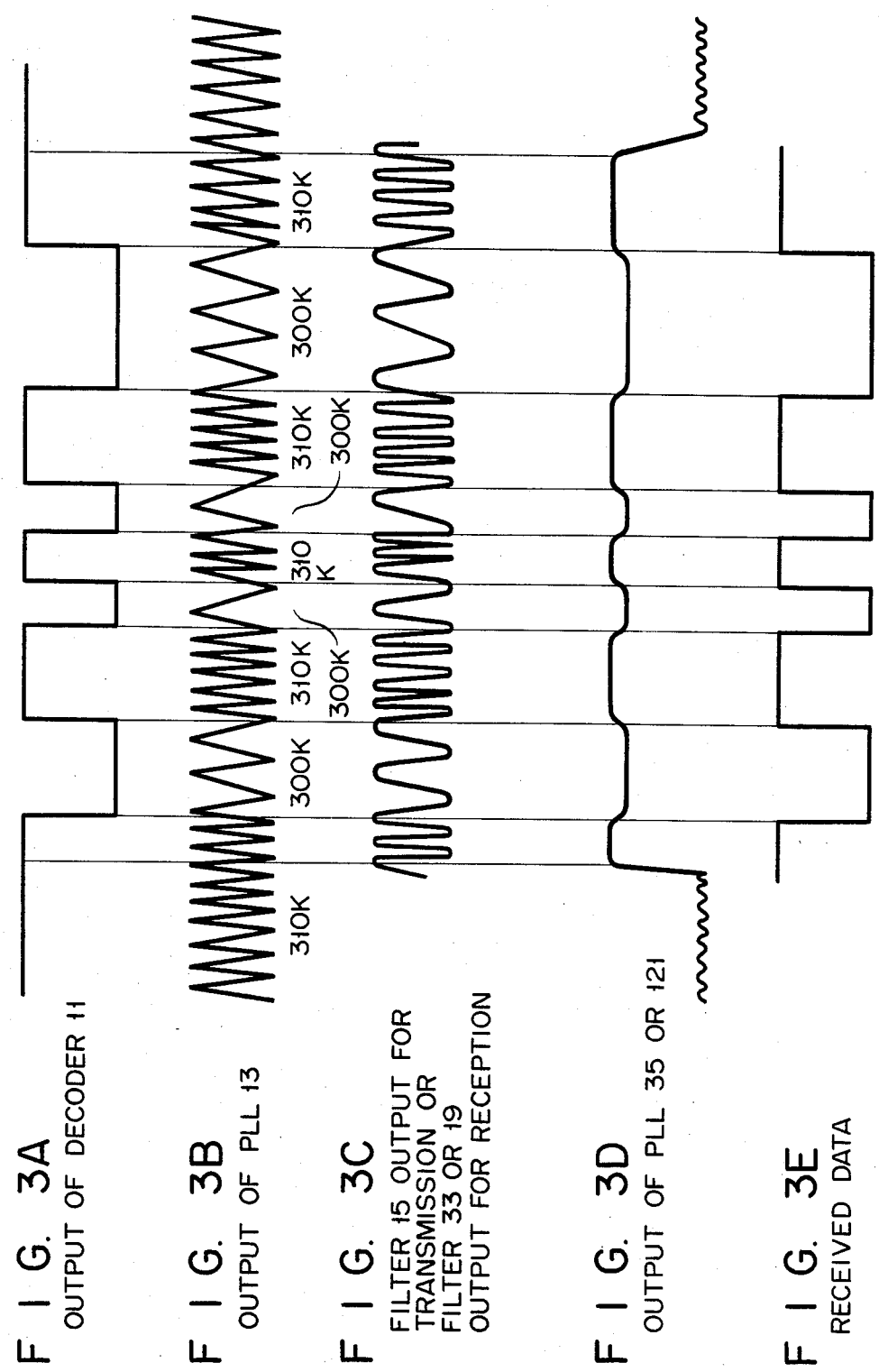

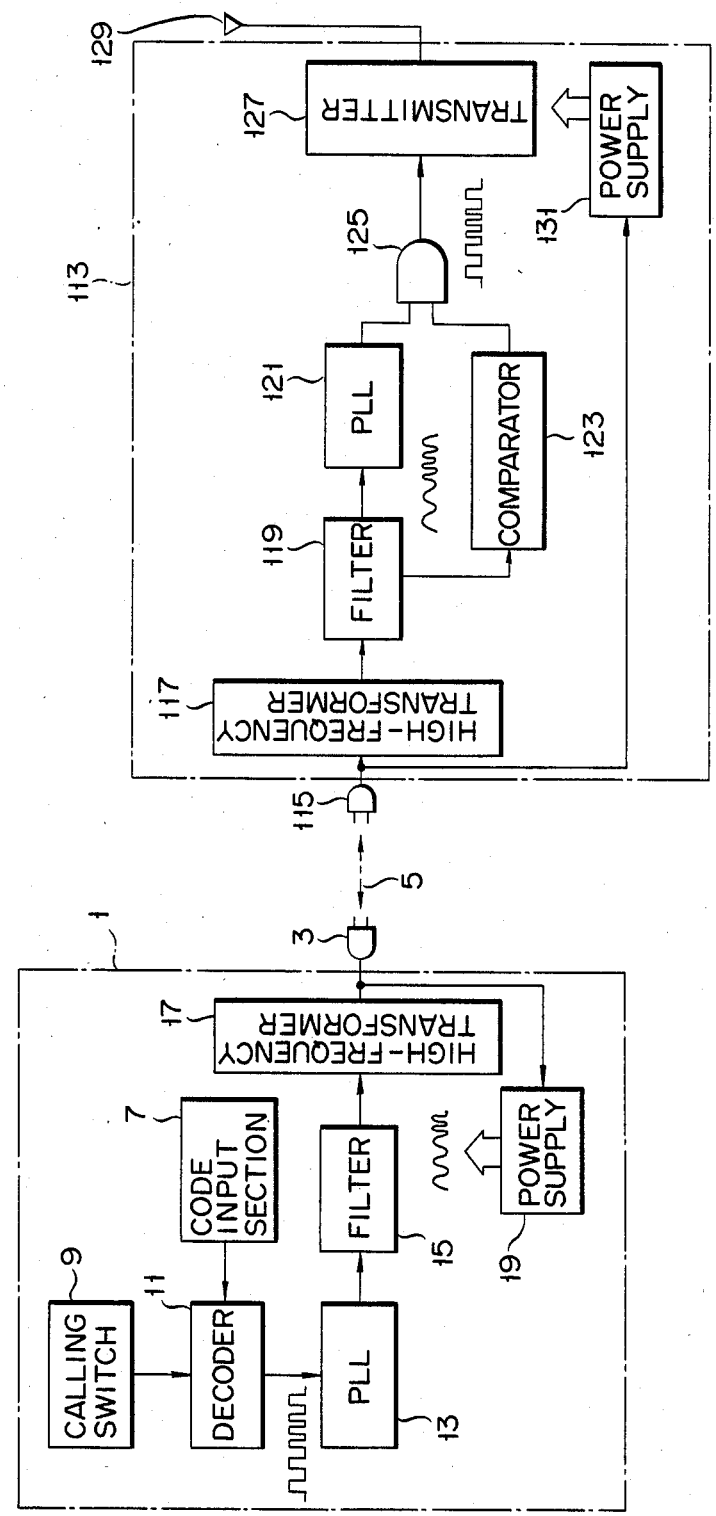
F I G. 5

F I G. 8A
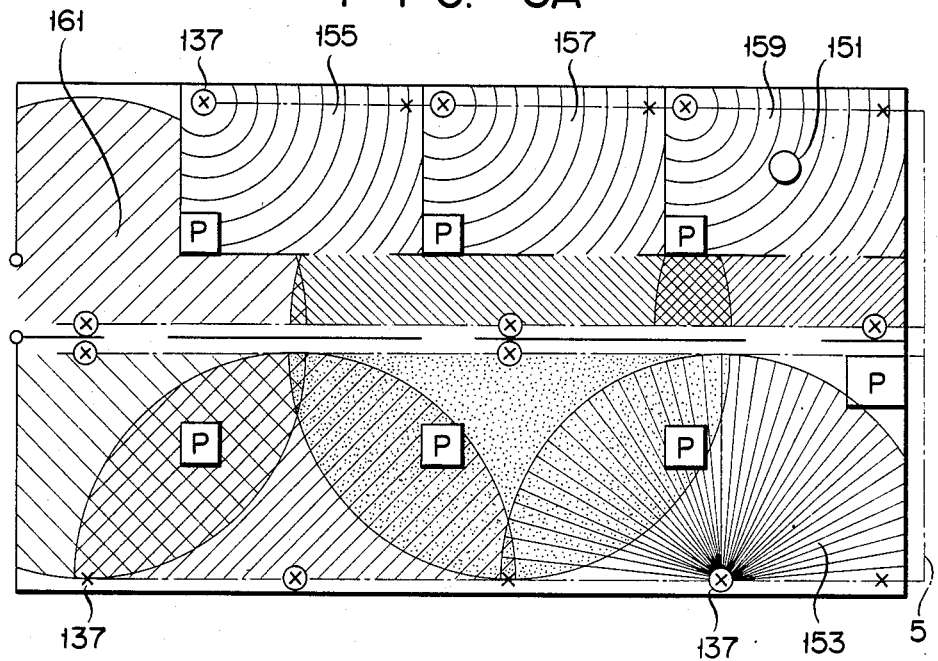
F I G. 8B
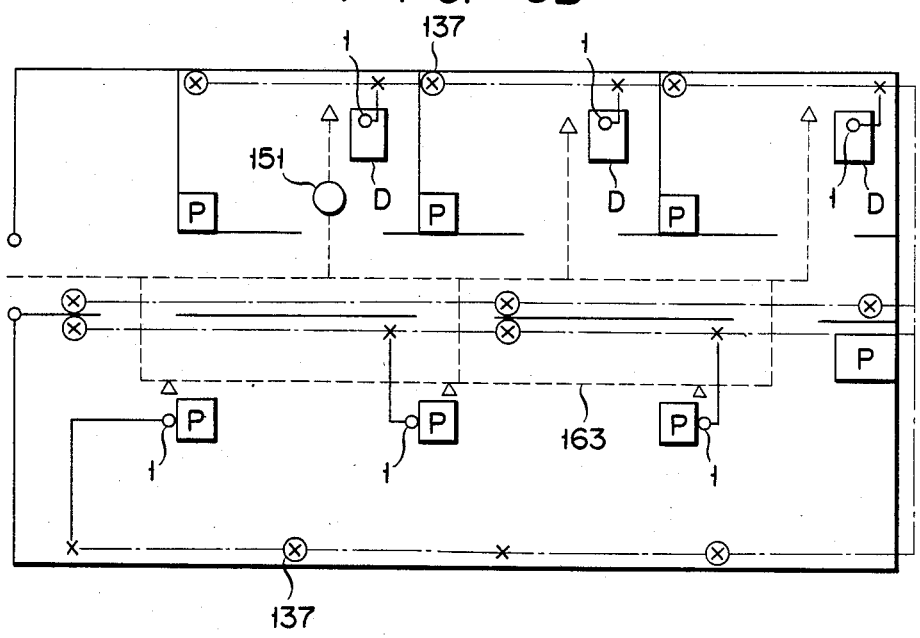

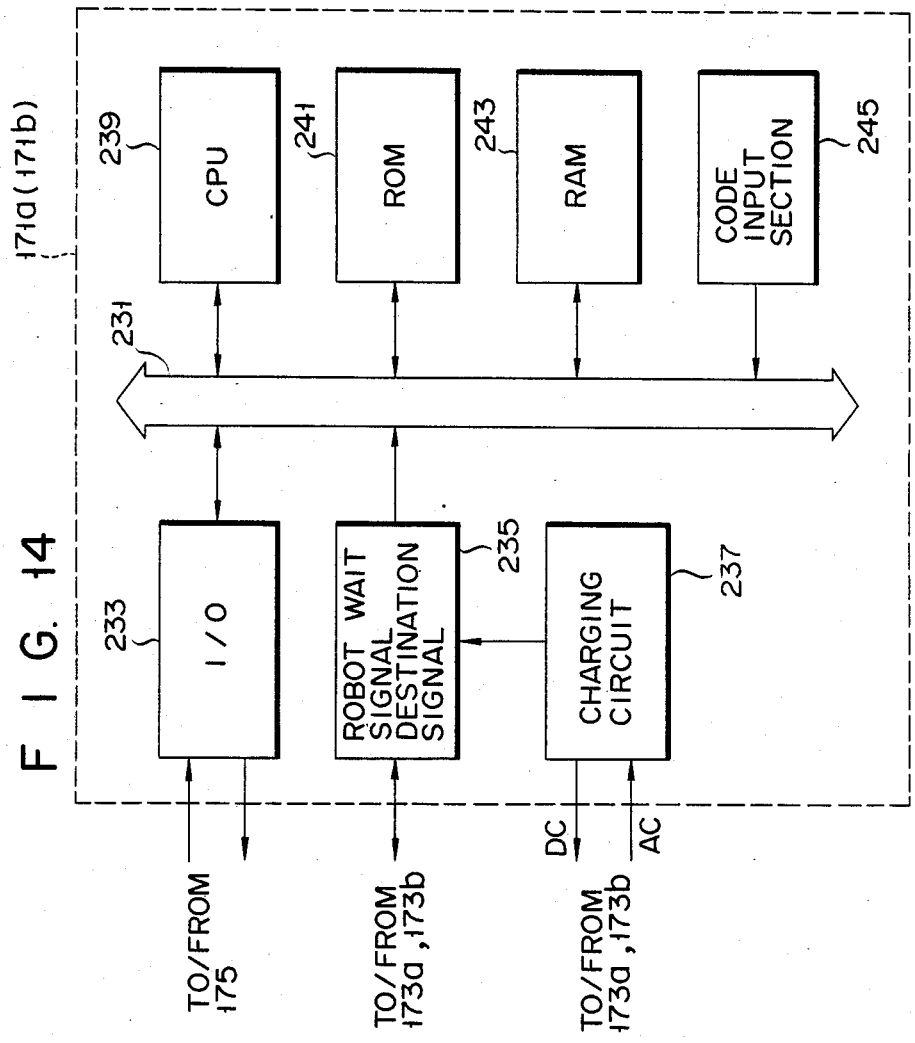
F I G. 14

FIG. 15A

| HEADER (247) | CALLING DEVICE DESIGNATION CODE (249) | CALLING INQUIRY CODE (251) | END CODE (253) |

FIG. 15B

| HEADER (255) | CALLING DEVICE DESIGNATION CODE (257) | CANCEL INQUIRY CODE (259) | END CODE (261) |

FIG. 15C

| HEADER (263) | STATION DESIGNATION CODE (265) | WAIT INQUIRY CODE (267) | END CODE (269) |

FIG. 15D

| HEADER (271) | STATION DESIGNATION CODE (273) | DESTINATION CODE (275) | END CODE (277) |

FIG. 15E

| HEADER (279) | INDIVIDUAL DEVICE CODE (281) | ROBOT CALLING SIGNAL PRESENCE CODE (283) | RESERVATION TIME CODE (284) | END CODE (285) |

(FUNCTION CODE)

FIG. 15F

| HEADER (287) | INDIVIDUAL STATION CODE (289) | ROBOT NO. CODE (FUNCTION CODE) (291) | END CODE (293) |

MOBILE ROBOT CALLING SYSTEM

BACKGROUND OF THE INVENTION

The present invention relates to a mobile robot calling system in a mobile robot system, wherein a predetermined route is prestored in a robot, and the robot is called from a predetermined spot to a designated spot.

Conventional self-driven robot systems have been proposed for offices and factories to convey items by mobile robots. In a conventional robot system of this type, the robot is generally called by a radio device.

However, when the robot is called by a radio device, radio waves may not reach the robot depending upon the position of a caller or the robot. Therefore, robot calling is limited to a predetermined area.

When a transmission output is increased to cause radio waves to reach the robot irrespective of the position of the robot, the high transmission output adversely influences electrical equipment.

When a plurality of calling devices are used to call the mobile robot, calling control becomes complicated.

SUMMARY OF THE INVENTION

It is an object of the present invention to provide a mobile robot calling system wherein a layout of an office or factory need not be modified, a low output wave can be used to communicate with a robot in a wide area, and the robot can be called irrespective of position.

It is another object of the present invention to provide a mobile robot calling management system, wherein a simple construction can be adopted to properly call the mobile robot by a plurality of calling devices.

In order to achieve the above objects of the present invention, there is provided a mobile robot system, comprising:

indoor alternating current power supply wiring for supplying an alternating current power supply voltage;

robot calling signal generating means for generating a robot calling signal to call the mobile robot;

superposing means for superposing the robot calling signal from said calling signal generating means on the alternating current power supply voltage from said indoor alternating current power supply wiring; and a mobile robot to be connected to said indoor alternating current power supply wiring so as to receive the robot calling signal supplied through said indoor alternating current power supply wiring, thereby performing a predetermined operation.

According to the present invention, in the mobile robot system, the mobile robot can be properly called from any location without modifying the layout of an office or factory since the robot calling signal is supplied through the indoor AC power supply wiring. When the robot completes the predetermined operation, it returns to the home position, is electrically charged, and awaits the next command, thereby effectively utilizing the waiting time as charge time.

The robot calling signal is supplied through the indoor AC power supply wiring and is relayed by relay transmitters respectively plugged into a plurality of AC receptacles. Wide-range communication can thus be obtained with a low output wave. The robot can be called from any position, and adverse influence on other electrical equipment can be completely prevented.

A robot calling state at a calling device, and a robot waiting state in a waiting station are constantly monitored by a controller. A robot calling control signal is supplied to a waiting station in synchronism with the calling signal and the robot waiting state. Even if a plurality of calling devices are provided, mobile robot calling management can be properly performed.

BRIEF DESCRIPTION OF THE DRAWINGS

A more complete understanding of the advantages, structure and operation of the present invention may be had by referring to the following detailed description when taken in conjunction with the accompanying drawings, in which:

FIGS. 3A through 3E are respectively timing charts for explaining the operation of the system, in which FIG. 3A shows a waveform of transmitted data, FIG. 3B shows a waveform of the signal from a PLL 13, FIG. 3C shows a waveform of an output from a filter 15 at the time of transmission, FIG. 3D shows a waveform of an output from a PLL 35, and FIG. 3E shows a waveform of received data;

FIG. 5 is a block diagram of a calling oscillator and a relay transmitter according to another embodiment of the present invention;

FIGS. 8A and 8B are respectively plan views of office floor layout in which the mobile robot is used;

FIG. 14 is a detailed block diagram of the waiting station shown in FIG. 11;

FIGS. 15A through 15F respectively show data formats of control data, in which FIGS. 15A and 15B show the control data used in the calling device, FIG. 15C shows the control data used in the waiting station, FIG. 15D shows the control data of the mobile robot, FIG. 15E shows the control data used in the calling device, and FIG. 15F shows the control data used in the waiting station;

DETAILED DESCRIPTION OF THE PREFERRED EMBODIMENTS

Figure 1:
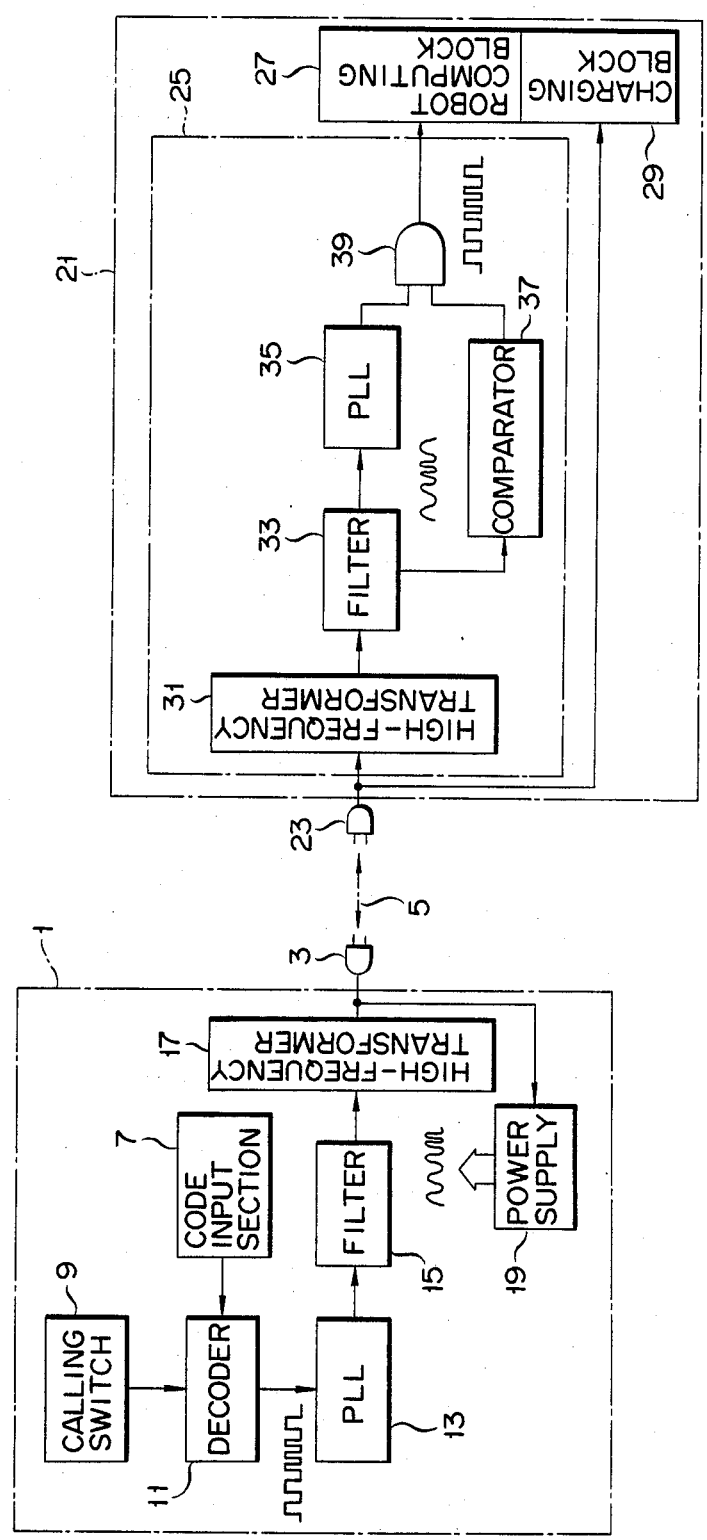
FIG. 1 is a block diagram showing the overall configuration of a mobile robot calling system according to an embodiment of the present invention.

A preferred embodiment of the present invention will be described with reference to the accompanying drawings. A calling oscillator 1 is connected to an indoor wiring 5 of a commercial AC power supply (AC) through a plug 3. The calling oscillators 1 (only one oscillator is illustrated in FIG. 1) have code input sections 7 for generating different identification codes, respectively. Each calling oscillator 1 has a calling switch 9. When the calling switch 9 is turned on, a code generated from the corresponding code input section 7 is supplied to a PLL (phase locked loop) circuit 13 through a decoder 11. The PLL circuit 13 generates two types of FM-modulated signals in accordance with the logic level of the input signal, e.g., a 310-kHz FM-modulated signal when the input signal is set at logic "1", and a 300-kHz FM-modulated signal when the input signal is set at logic "0". The output from the PLL circuit 13 is supplied to a band-pass filter 15. The band-pass filter 15 eliminates higher harmonics and supplies it to a high frequency transformer 17. The high frequency transformer 17 supplies the output from the band-pass filter 15 to the indoor AC wiring 5 through the plug 3. As a result, a robot calling signal is superposed on the AC signal. A power supply 19 is connected to the plug 3. An operating current is supplied from the power supply 19 to the respective components described above.

A mobile robot 21 is normally waiting in the home position. In this case, the mobile robot 21 is connected to the indoor AC power supply wiring 5 through an AC charge socket having an automatic charging terminal mechanism 23. A robot calling signal demodulator 25, a robot computing block 27, and a charging block 29 are arranged in the mobile robot 21. The robot calling signal demodulator 25 and the charging block 29 are connected to the automatic charging terminal mechanism 23. The robot calling signal demodulator 25 supplies the calling signal from the calling oscillator 1 to a high frequency transformer 31. The calling signal is also supplied to a comparator 37 and a PLL circuit 35 through a band-pass filter 33. The PLL circuit 35 includes a wave shaping circuit which comprises a resistor, diodes, a capacitor and an operational amplifier. The PLL circuit 35 receives a signal obtained by eliminating a harmonic component from the calling signal through the filter 33. The PLL circuit 35 supplies a phase-locked 310-kHz or 300-kHz signal which is wave-shaped to an AND gate 39.

The comparator 37 receives a 310- or 300-kHz reference frequency signal from a reference signal generator incorporated in the comparator 37. The comparator 37 includes an integrator and first and second reference voltage sources which are not shown. The output from the band-pass filter 33 includes a noise component. Thus, the comparator 37 discriminates the input signal using the first reference voltage as a threshold value. Then, the integrator extracts the discriminated signal using the second reference voltage as the threshold value. The comparator 37 further wave-shapes the extracted signal to produce a pulse signal with noise eliminated. On the other hand, the output from the PLL circuit 35 includes noises the amplitude of which are small and noises which have high-peak values. For this reason, the output signal from the comparator 37 and the output signal from the PLL circuit 35 are supplied to an AND circuit 39. The AND circuit 39 passes the robot calling signal from the PLL circuit 35 only when the comparator 37 produces an output signal. As a result, the output from the AND circuit 39 forms a robot calling signal without noises.

Figure 2:
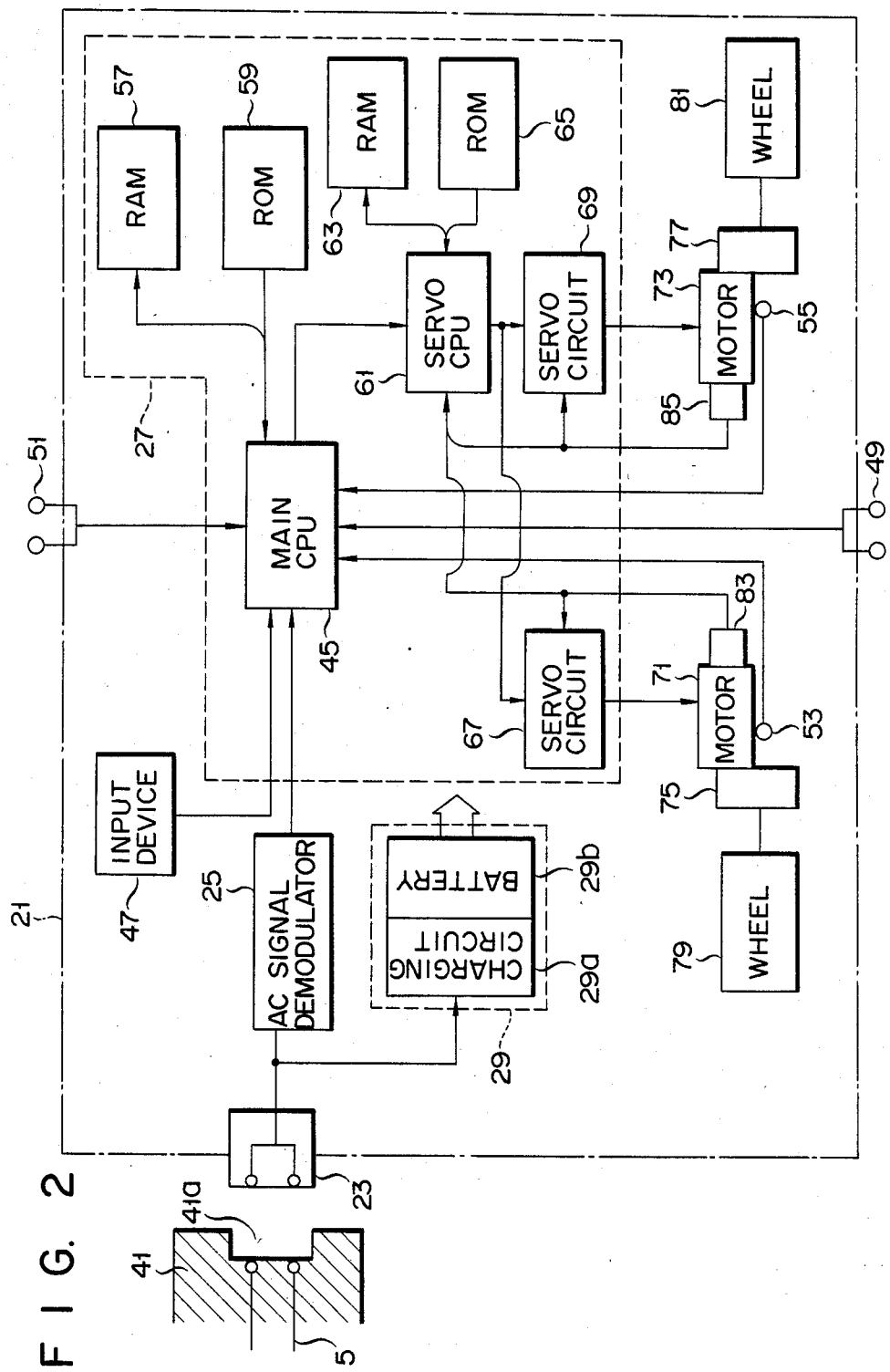
FIG. 2 is a detailed block diagram of a mobile robot shown in FIG. 1.

The detailed block diagram of the mobile robot is illustrated in FIG. 2. The mobile robot 21 is normally waiting in the home position. The automatic charging terminal mechanism 23 in the mobile robot 21 is connected to the indoor AC wiring 5 through an AC charging socket 41a mounted on a charging post 41, and the charging block 29 is charged. The charging block 29 comprises a charging circuit 29a and a battery 29b. The charging circuit 29a rectifies the commercial AC power supply voltage and charges the battery 29b. An output voltage from the battery 29b is applied as an operating voltage to the respective components. An output from the robot calling signal demodulator 25 is supplied to a main CPU 45 in the robot computing block 27. An input device 47, direction identification sensors 49 and 51, and line sensors 53 and 55 are connected to the main CPU 45. A RAM 57 for storing robot data, a ROM 59 for storing the robot control program, and a servo CPU 61 are connected to the main CPU 45. The main CPU 45 may comprise a 16-bit microcomputer Z8000, and the servo CPU 61 may comprise an 8-bit microcomputer Z80, these being available from Zilog Corp., U.S.A.

The input device 47 has a route map data input key, a destination designation key, a start key, a home position return switch, and so on. The sensor 49 is arranged in the vicinity of a front caster (not shown), and the sensor 51 is arranged in the vicinity of a rear caster (not shown). A RAM 63 for storing vehicle data and a ROM 65 for storing a wheel servo control program are connected to the servo CPU 61. The servo CPU 61 supplies control commands to servo circuits 67 and 69, and the servo circuits 67 and 69 respectively drive motors 71 and 73. The motors 71 and 73 drive right and left wheels 79 and 81 through gear boxes 75 and 77, respectively. Rotation of the motors 71 and 73 is detected by encoders 83 and 85. Detection signals are respectively supplied from the encoders 83 and 85 to the servo circuits 67 and 69 and the servo CPU 61. The line sensors 53 and 55 are disposed in the vicinities of the motors 71 and 73, respectively.

The operation of the system having the configuration described above will be described hereinafter. In an office or factory, a route of the mobile robot 21 is installed in a matrix form. Circular marks are attached at intersections of the respective paths and the charging post 41. The mobile robot turns at each intersection by sensing the circular mark or is smoothly connected to the charging post.

Figure 4A:
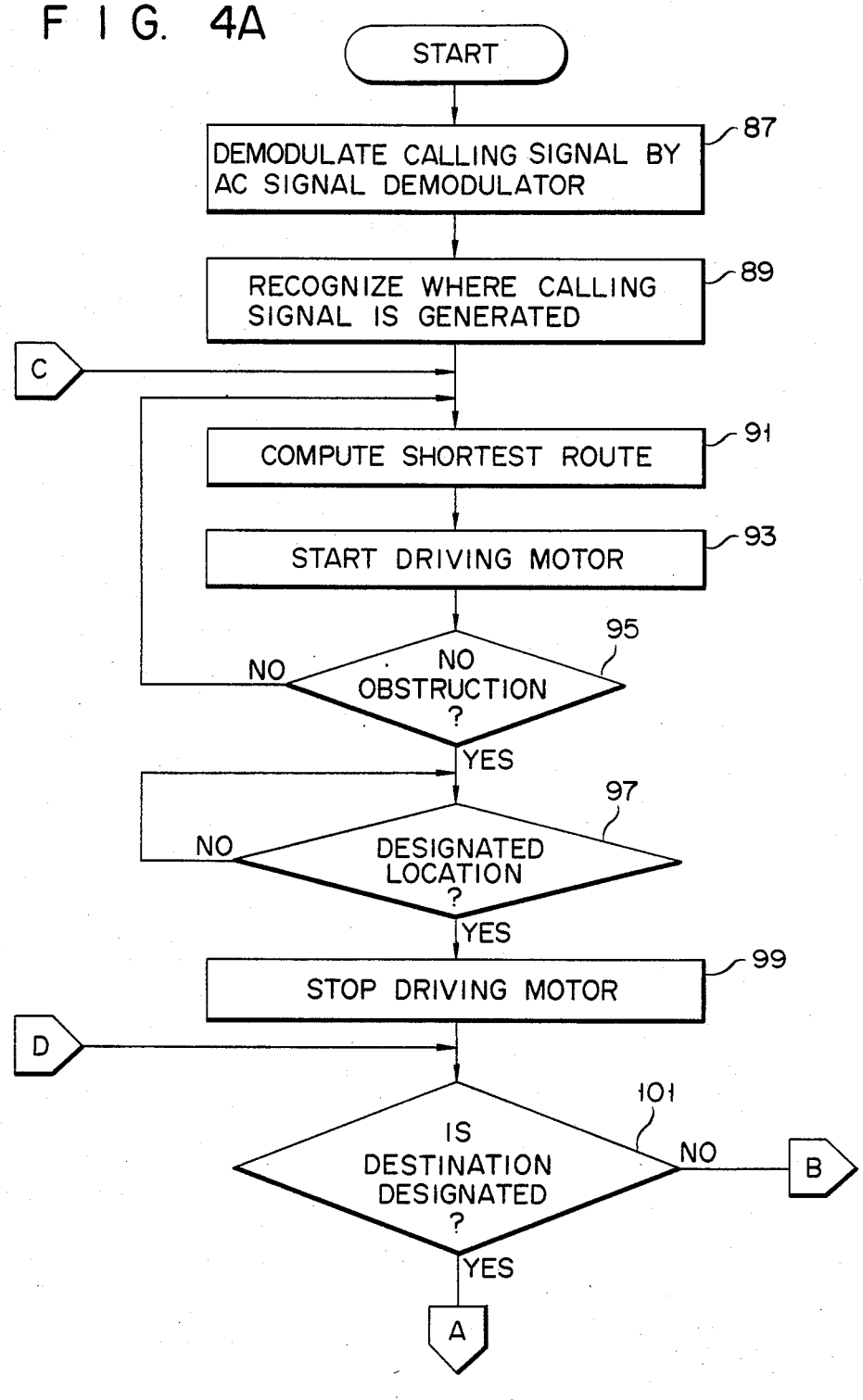
FIGS. 4A and 4B are respectively flow charts for explaining the operation of the system shown in FIG. 1.
Figure 4B:
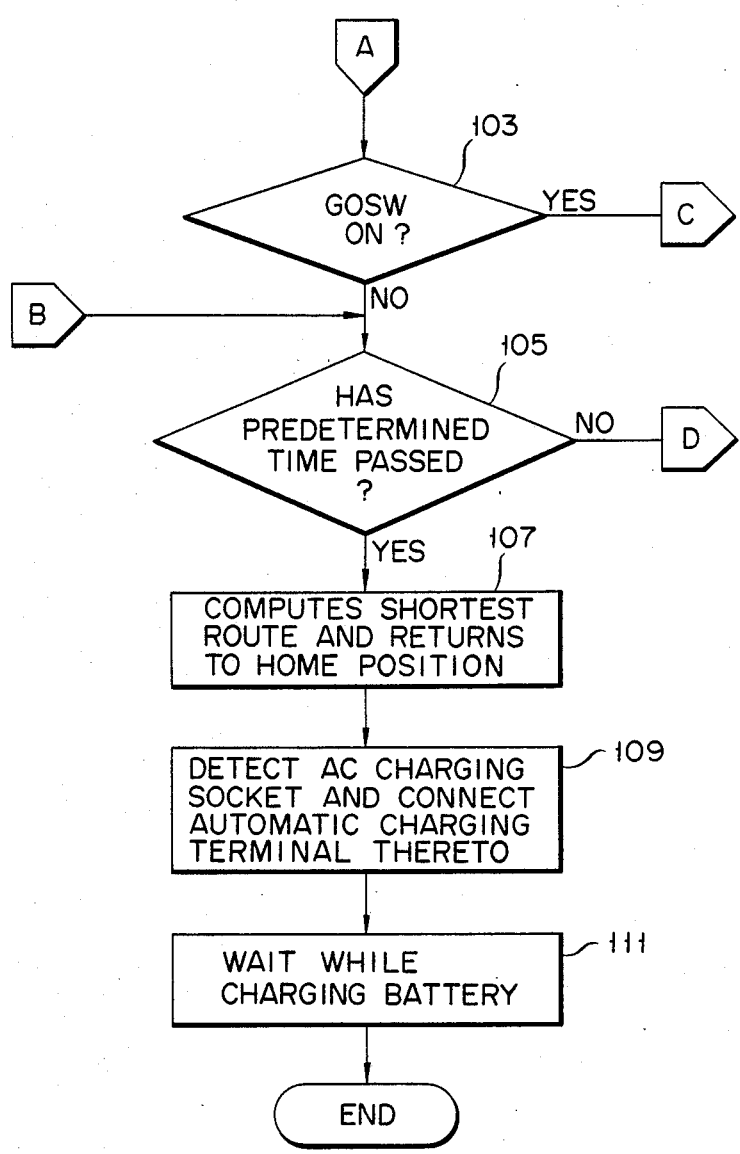

From the input device 47, the mobile robot 21 receives route map data, the output code from each calling oscillator 1, and the relationship between the marks in the route. The input data are stored in the RAM 57. The mobile robot 21 normally waits at the charging post 41 so that the automatic charging terminal mechanism 23 is connected to the indoor AC wiring 5 to charge the battery 29b. In this state, when the calling switch 9 in the calling oscillator 1 is turned on, the code signal from the code input section 7 is decoded by the decoder 11, as shown in FIG. 3A. The decoded signal is supplied to the PLL circuit 13. The PLL circuit 13 generates one of the 310- and 300-kHz signals in accordance with the logic level of the input code signal. The FM signal from the PLL circuit 13 is supplied to the filter 15 which eliminates a harmonic component of the triangular wave. The resultant signal is supplied to the indoor AC wiring 5 from the high frequency transformer 17 through the plug 3. In this manner, the FM signal from the calling oscillator 1 is superposed on the 50/60 Hz AC power supply. A superposed signal is supplied to the mobile robot 21 through the indoor AC wiring 5. When the mobile robot 21 receives the calling signal from the calling oscillator 1, the mobile robot is operated in accordance with the flow charts in FIGS. 4A and 4B. In step 87, the received calling signal is demodulated by the robot calling signal demodulator 25. The robot calling signal demodulator 25 extracts the calling signal from the commercial AC power supply. The extracted calling signal is supplied to the PLL circuit 35 and the comparator 37 through the filter 33. When the PLL circuit 35 receives the signal, it eliminates the harmonic components of the two types of FM signals, as shown in FIG. 3D. The resultant component is supplied as the calling signal to the AND gate 39. On the other hand, the comparator 37 eliminates the noise component with the reference voltages and the integrator, wave-shapes the signal and supplies it to the AND circuit 39, as previously described. The AND circuit 39 passes the output signal from the PLL circuit 35 only when the output signal from the comparator 37 is present. As a result, the noise-eliminated robot calling signal is supplied to the robot computing block 27. In step 89, the robot computing block 27 recognizes a calling port in accordance with the signal demodulated by the robot calling signal demodulator 25. In step 91, the robot computing block 27 calculates the shortest route to the calling port in accordance with the route map data stored in the RAM 57, and the calculated data is written in the RAM 57. In step 93, the main CPU 45 supplies a start command to the servo CPU 61. The servo CPU 61 supplies control commands to the servo circuits 67 and 69 in accordance with the data supplied from the main CPU 45. When the motors 71 and 73 drive the wheels 79 and 81, respectively, the mobile robot 21 is started after the automatic charging terminal mechanism 23 is disconnected from the AC charging socket 41a. The encoders 83 and 85 generate pulse signals in accordance with the rotational speeds of the motors 71 and 73, respectively. These pulse signals are fed back to the servo circuits 67 and 69 and the servo CPU 61. The servo circuits 67 and 69 respond to the numbers of pulses to keep the vehicle speed constant. The servo CPU 61 compares the numbers of pulses from the right and left encoders. For example, when the mobile robot travels straight, the servo circuits 67 and 69 are controlled to drive the motors 71 and 73 at the same rotational speed. During traveling, the servo CPU 61 checks in step 95 whether an obstruction is present. If NO in step 95, the flow returns to step 91, and the next shortest course is searched. However, if YES in step 95, the flow advances to step 97. The servo CPU 61 checks whether or not the mobile robot has reached the designated position. If NO in step 97, looping continues until the mobile robot reaches the designated position. However, if YES in step 97, the flow advances to step 99, and the motors 71 and 73 are stopped. The flow then advances to step 101. The servo CPU 61 checks in step 101 whether or not the destination is designated. When the mobile robot 21 is moved to the caller, the servo CPU 61 checks whether the caller has placed a document or an article at a predetermined position of the mobile robot, a desired destination is designated by the input device 47, and the start key is turned on. When it is discriminated that the destination is designated, the flow advances to step 103. The servo CPU 61 checks in step 103 whether the start key is turned on. If YES in step 103, the flow returns to step 91. The mobile robot calculates the shortest course to the designated position. When the servo CPU 61 determines that the destination is not designated in step 101, or if NO in step 103, the flow advances to step 105. The CPU 61 then checks in step 105 whether a predetermined period of time has passed after the mobile robot reaches the designated position. If NO in step 105, the flow returns to step 101. However, if YES in step 105, the flow advances to step 107 wherein the shortest course to the home position is calculated. When the mobile robot returns to the home position, in step 109, the AC charging socket 41a connected to the charging post 41 is detected to couple the automatic charging terminal mechanism 23. In step 111, the mobile robot waits while the battery 29b is charged.

Figure 6:
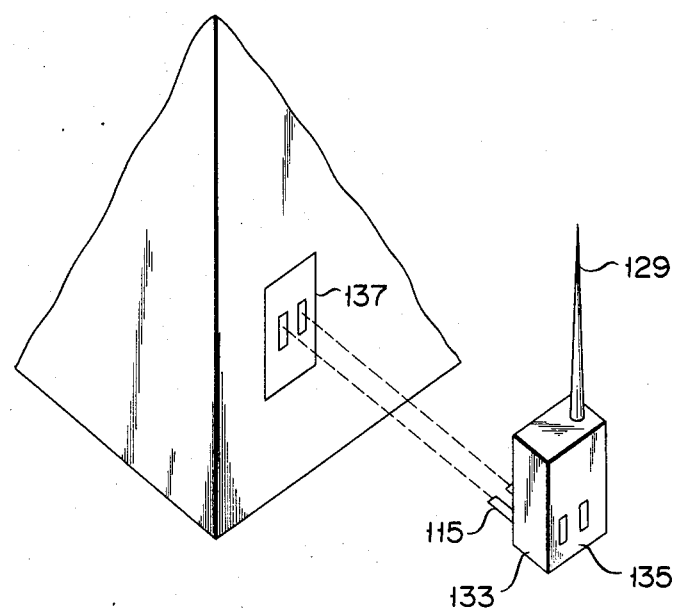
FIG. 6 is a perspective view showing the outer appearance of the relay transmitter shown in FIG. 5.
Figure 7:
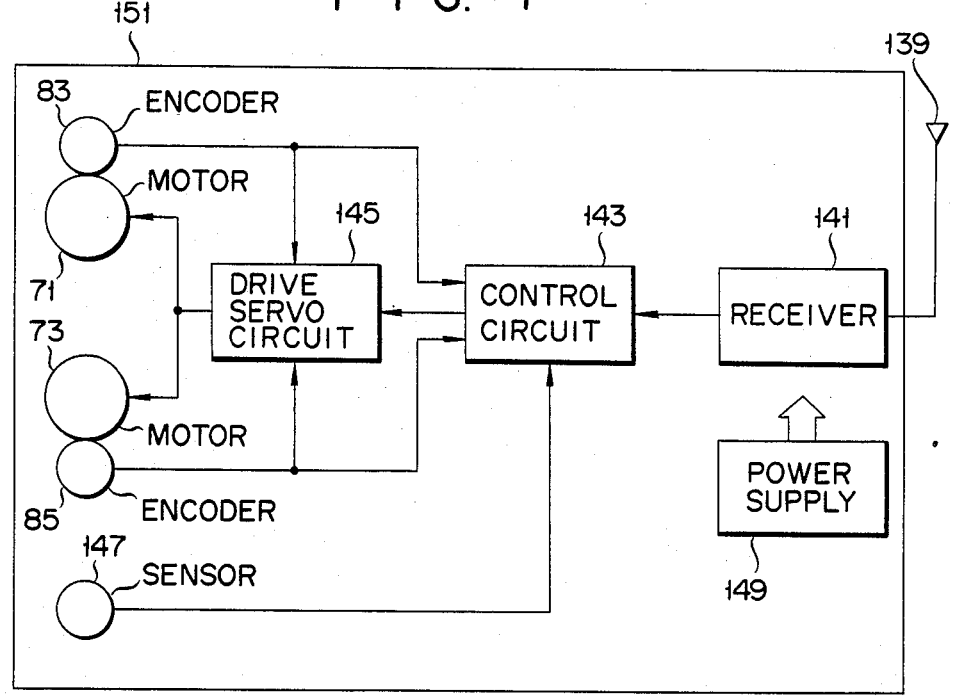
FIG. 7 is a block diagram of a mobile robot when the calling oscillator of FIG. 5 and the relay transmitter of FIG. 6 are used in combination.

FIGS. 5, 6 and 7 show another embodiment of the present invention. According to this embodiment, wide-range communication can be performed with a low output wave, and the mobile robot can be properly called from any position. The same reference numerals as in FIGS. 5, 6 and 7 denote the same parts as in FIGS. 1 and 2, and a detailed description thereof will be omitted.

A calling oscillator 1 in FIG. 5 is the same as that of FIG. 1. In the second embodiment, a relay transmitter 113 is connected to an indoor AC wiring 5 through an AC plug 3. The relay transmitter 113 extracts the calling signal from the calling oscillator 1 through the indoor AC wiring 5 by means of a high frequency transformer 117. The extracted calling signal is supplied to a PLL circuit 121 and a comparator 123 through a filter 119. The functions of the PLL circuit 121 and the comparator 123 are the same as those of the PLL circuit 35 and the comparator 37 shown in FIG. 1. The calling signal from the PLL circuit 121 and the enable signal from the comparator 123 are supplied to a transmitter 127 through an AND gate 125.

The signal is radiated in the atmosphere from the transmitter 127 through an antenna 129. In this case, the transmitter 127 is arranged such that a wave transmission distance is about 5 m at an output of about 100 mW. A power supply 131 is connected to the AC plug 115 to supply an operating voltage to the respective circuits. The relay transmitter 113 is arranged in a compact case 133, as shown in FIG. 6. The AC plug 115, an AC receptacle 135 and the antenna 129 are mounted on the case 133. The AC plug 115 of the relay transmitter 113 is inserted in the corresponding AC receptacle 137 in each room.

The wave emitted from the antenna 129 of the relay transmitter 113 is received by an antenna 139 of a mobile robot 151 in FIG. 7. The wave received by the antenna 139 is demodulated by a receiver 141, and the demodulated signal is supplied to a control circuit 143. The control circuit 143 calculates an optimal route between the current position and the designated position in accordance with the reception signal. The control circuit 143 supplies a control command to a drive servo circuit 145 in accordance with the calculated results. The drive servo circuit 145 then drives the motors 71 and 73 in accordance with the control command. As a result, the wheels of the mobile robot are rotated. The rotational speeds of the motors 71 and 73 are detected by the encoders 83 and 85, respectively. The detection signals are then fed back to the drive servo circuit 145 and the control circuit 143. The control circuit 143 comprises the main CPU 45, the servo CPU 61, the RAM 57, the ROM 59, the RAM 63, the ROM 65 and the like, as shown in FIG. 2. The control circuit 143 receives a detection signal from a sensor 147 for detecting a passing point or the like. A DC power supply 149 such as a battery is arranged in the mobile robot 151. A voltage is applied from the DC power supply 149 to the respective components.

Each relay transmitter 113 is connected to each of a plurality of AC receptacles 137 to cause the wave from the transmitter 113 to cover the entire floor. FIGS. 8A and 8B show a case wherein the relay transmitters 113 are mounted in an office. More particularly, FIGS. 8A and 8B show a case wherein the mobile robot 151 is moved on a floor of one large room 153 and three small rooms 155, 157 and 159. A path 161 is formed between the large room 153 and the small rooms 155, 157 and 159. AC receptacles 137 each indicated by the mark x are mounted in the small rooms 155, 157 and 159, respectively. A plurality of AC receptacles 137 are mounted in the large room 153. Among the plurality of AC receptacles 137, those indicated by the mark o are connected to the relay transmitters 113, respectively. In this case, the relay transmitters 113 are arranged in positions to cause the transmitted waves to cover the entire floor. Referring to FIG. 8B, dotted lines represent predetermined robot paths 163; the Δ marks, passing points of the mobile robot; D, desks; and P, poles, respectively. Each oscillator 1 is mounted on each desk D and each pole P. The AC plug 3 is inserted in the nearest AC receptacle 137.

The operation of the embodiment shown in FIGS. 5 through 7 will be described. The route map data of the robot paths 163, the output codes of the respective calling oscillators 1 and data representing a relationship between the respective passing points of the robot are supplied from the input device 47 to the mobile robot 151. These input data are stored in the RAM 57. When the caller turns on the calling switch 9 in the calling oscillator 1, the corresponding code is generated from the code input section 7 and is decoded by the decoder 11, as shown in FIG. 3A. The decoded signal is supplied to the PLL circuit 13. As shown in FIG. 3B, the PLL circuit 13 generates one of the 310- and 300-kHz FM signals in accordance with the logic level of the input code signal. The FM signal is supplied to a filter 15 which eliminates a harmonic component of a triangular wave. The filtered signal from the high frequency transformer 17 is supplied to the indoor AC wiring 5 through the AC plug 3. The FM signal from the calling oscillator 1 is superposed on the 50/60 Hz voltage. This superposed signal is transmitted to each relay transmitter 113 through the indoor AC wiring 5. When the relay transmitter 113 receives the calling signal from the calling oscillator 1, the high frequency transformer 117 extracts the calling signal from the commercial AC power supply voltage, and the extracted calling signal is supplied to the PLL circuit 121 and the comparator 123 through the filter 119. When the PLL circuit 121 receives the signal, it synchronizes the phases of the two modulated signals, as shown in FIG. 3D. The signal from the PLL circuit 121 is supplied as the calling signal to the AND gate 125. As previously described, the comparator 123 eliminates a noise component and supplies the wave-shaped output signal to the AND circuit 125. The AND circuit 125 passes the output signal from the PLL circuit 121 only when the output signal from the comparator 123 exists. Therefore, the designated signal is supplied to the transmitter 127. The transmitter 127 modulates the calling signal from the AND gate 125 by using a high frequency signal (carrier wave). The modulated signal is radiated to the mobile robot 151 through the antenna 129. The mobile robot 151 receives the wave radiated from the relay transmitter 113, and the wave is demodulated by the receiver 141. The demodulated signal is supplied to the control circuit 143. The control circuit 143 discriminates a calling port in accordance with the signal received and demodulated by the receiver 141. The control circuit 143 calculates the shortest route to the designated position in accordance with the route map data stored in the RAM 57. The control circuit 143 supplies a control command to the drive servo circuit 145 in accordance with the route data. The drive servo circuit 145 drives the motors 71 and 73 in accordance with the control command from the control circuit 143. The motors 71 and 73 rotate the wheels 79 and 81 to start the mobile robot 151. The encoders 83 and 85 generate pulse signals in accordance with the rotational speeds of the motors 71 and 73, respectively. The pulse signals from the encoders 83 and 85 are fed back to the drive servo circuit 145 and the control circuit 143. The drive servo circuit 145 controls the motors 71 and 73 which then have a predetermined speed in accordance with the numbers of pulses from the encoders 83 and 85. When the mobile robot 151 travels straight, the control circuit 143 supplies a control command to the drive servo circuit 145 so as to set the same rotational speed of the motors 71 and 73, thereby controlling the position of the mobile robot 151. In this manner, the robot 151 can be driven to a designated position. When the mobile robot 151 has reached the designated position, the motors 71 and 73 are stopped, and the mobile robot 151 waits there.

When the mobile robot 151 is moved to the caller, the caller places a document or an article on a predetermined position of the mobile robot 151. The caller then designates the destination by means of the input device 47 and operates the start key. When the destination is designated, the mobile robot 151 calculates the shortest route to the designated position and is moved to the destination.

Figure 9:
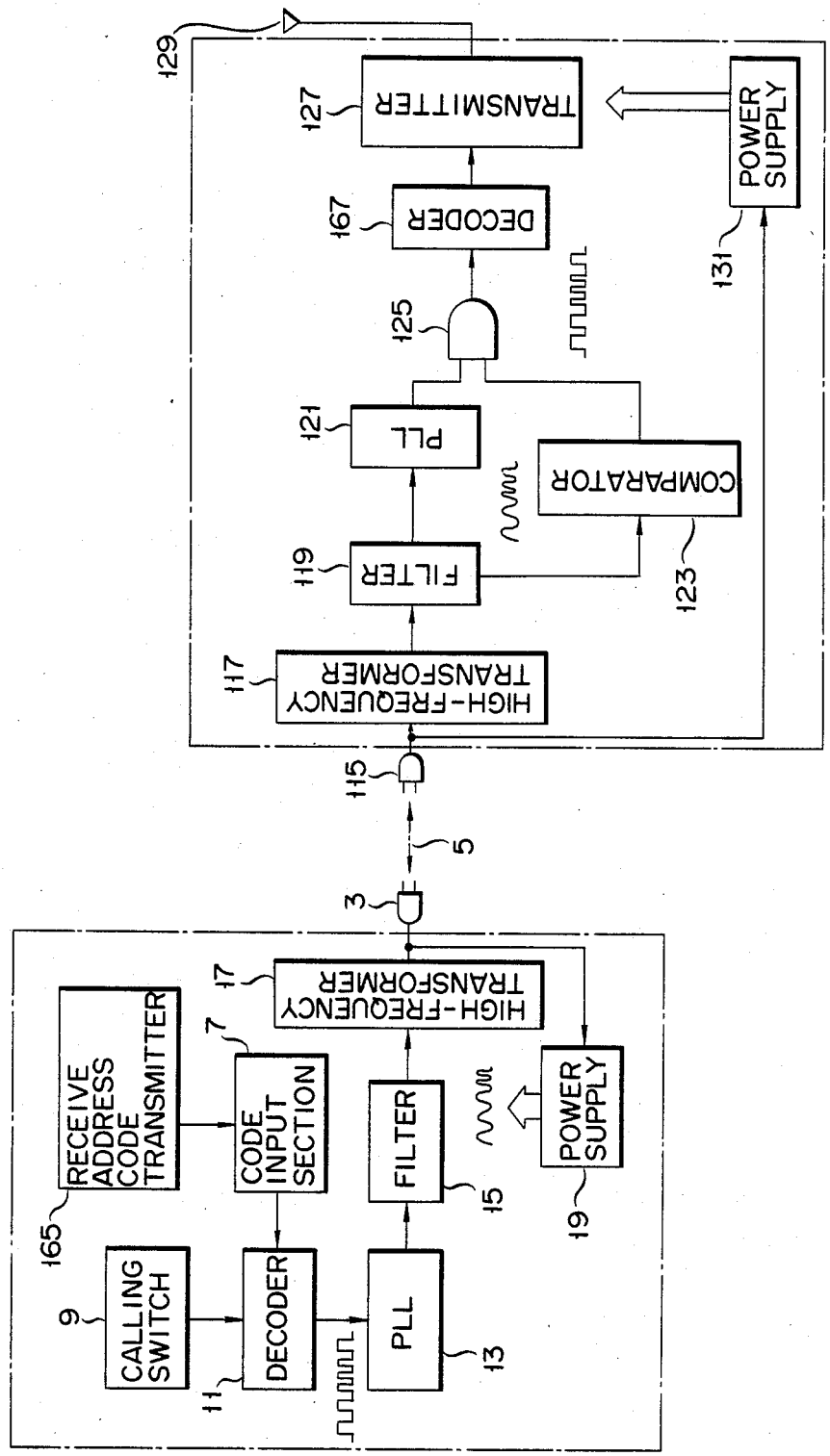
FIG. 9 is a block diagram of a system according to still another embodiment of the present invention.

FIG. 9 shows still another embodiment of the present invention. The same reference numerals as in FIG. 9 denote the same parts as in FIG. 5, and a detailed description thereof will be omitted. In the embodiment of FIG. 9, a receive address code transmitter 165 is connected to a code input section or generator 7 in a calling oscillator 1, and a decoder (code discriminator) 167 is connected to the output terminal of an AND gate 125 in a relay transmitter 113. The receive address code transmitter 165 sequentially generates receive address codes, respectively, corresponding to the relay transmitters 113. Each receive address code is added to the code from the code generator 7, and the resultant code is supplied to a decoder 11. As a result, the codes from the receive address code transmitter 165 are added to the calling codes, and the resultant codes are sequentially supplied from the calling oscillator 1 to the relay transmitter 113 through the indoor AC wiring 5. In the relay transmitter 113, the decoder 167 discriminates whether the receive address code from the calling oscillator 1 coincides with its own code. When the decoder 167 discriminates that the code coincides with its own code, the calling signal from the relay transmitter 113 is supplied to the transmitter 127 and is radiated from the antenna 129. With this arrangement, the respective relay transmitters 113 can sequentially transmit the calling signals. Even if the wave transmission areas of the respective relay transmitters 113 overlap, wave interference will not occur.

FIGS. 10 to 19D show still another embodiment of the present invention. In this embodiment, a controller 175 is arranged to control a plurality of calling devices 179a, 179b and 179c and robot waiting stations 171a and 171b. The controller 175 cyclically checks the robot calling states among the plurality of calling devices 179a, 179b and 179c, and robot waiting states in the robot waiting stations 171a and 171b. When the robot calling signals are generated from the calling devices 179a, 179b and 179c, the controller 175 supplies a calling command to the waiting stations 171a and 171b in accordance with the robot waiting states in the robot waiting stations 171a and 171b.

Figure 10:
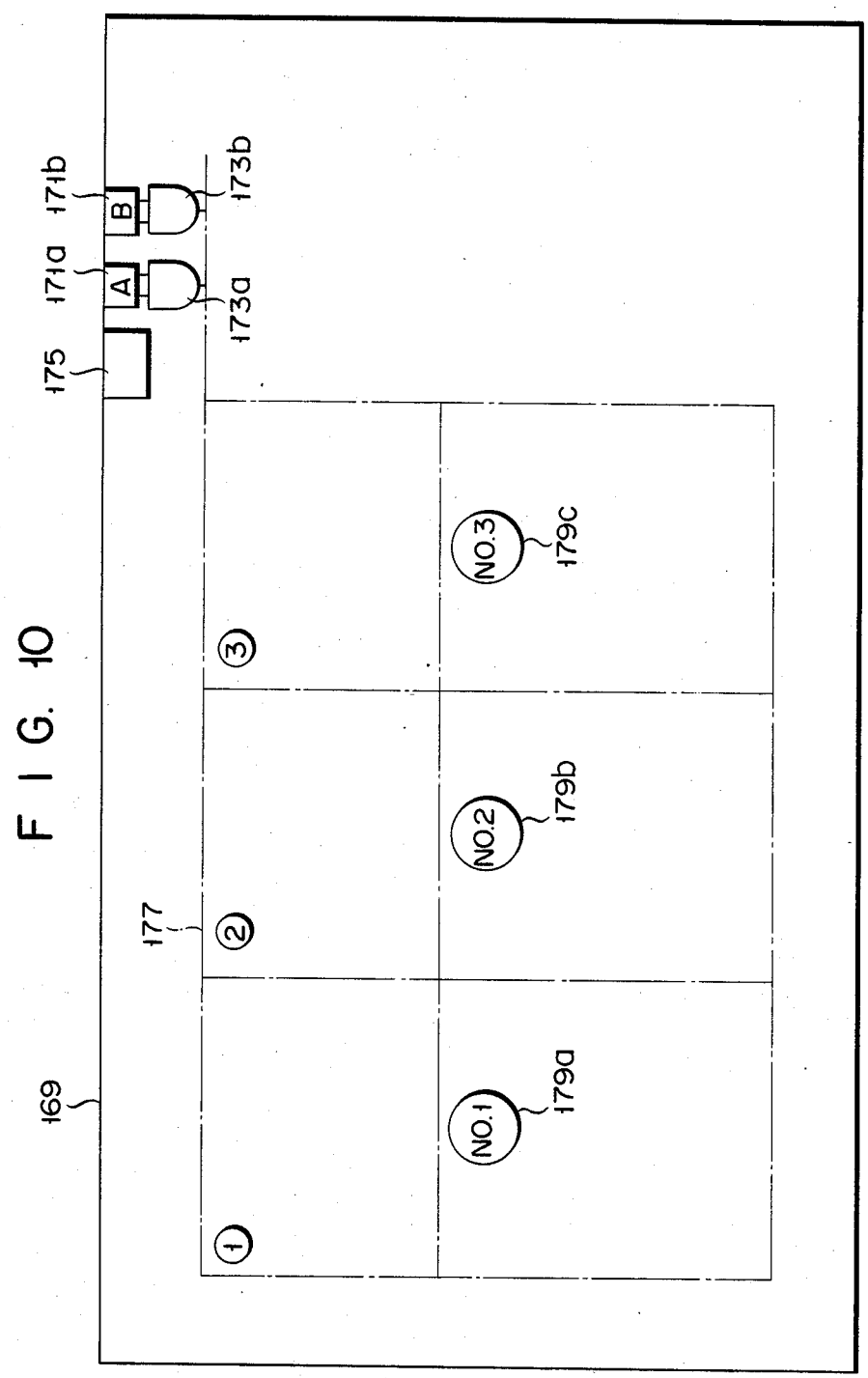
FIG. 10 is a plan view showing a robot route and a system arrangement in the system shown in FIG. 9.
Figure 11:
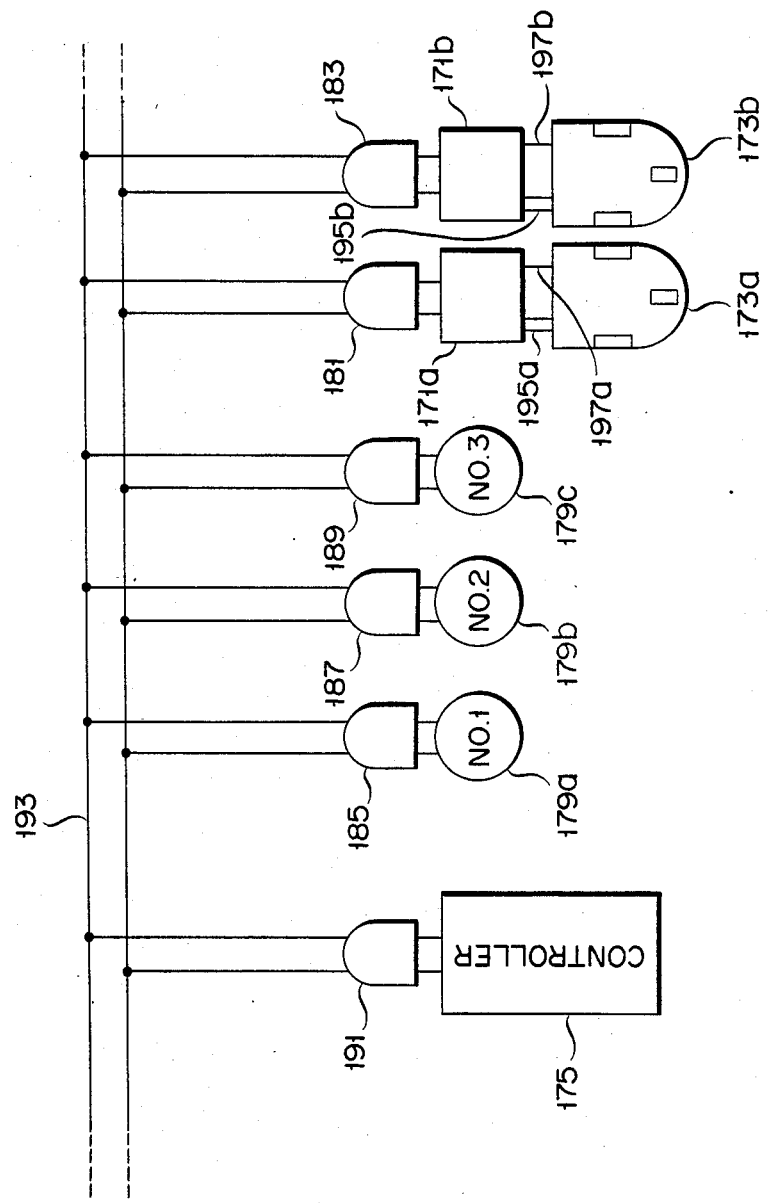
FIG. 11 is a block diagram showing the connections between the waiting stations, the controller, the calling devices and the mobile robot.

Referring to FIG. 10, the robot waiting stations 171a and 171b are installed on a floor 169 in an office, and mobile robots 173a and 173b are waiting in the mobile stations 171a and 171b, respectively. The controller 175 is arranged in the vicinity of the waiting stations 171a and 171b. A path 177 of the mobile robots 173a and 173b is installed to extend from the waiting stations 171a and 171b to cover a predetermined service area. At the same time, first to third calling devices 179a, 179b and 179c are arranged in the vicinity of the path 177. The waiting stations 171a and 171b, the controller 175, and the calling devices 179a, 179b and 179c are connected to an indoor wiring 193 of a commercial AC power supply through AC receptacles 181 to 191 arranged inside the office, as shown in FIG. 11. The controller 175 supplies a control signal to the waiting stations 171a and 171b and the calling devices 179a, 179b and 179c through the indoor wiring 193. Each of the waiting stations 171a and 171b has a signal receiver and a charging device. An AC power supply voltage is supplied to the mobile robots 173a and 173b through DC power supply lines 195a and 195b. The control data is supplied to the mobile robots 173a and 173b through signal lines 197a and 197b.

Figure 12:
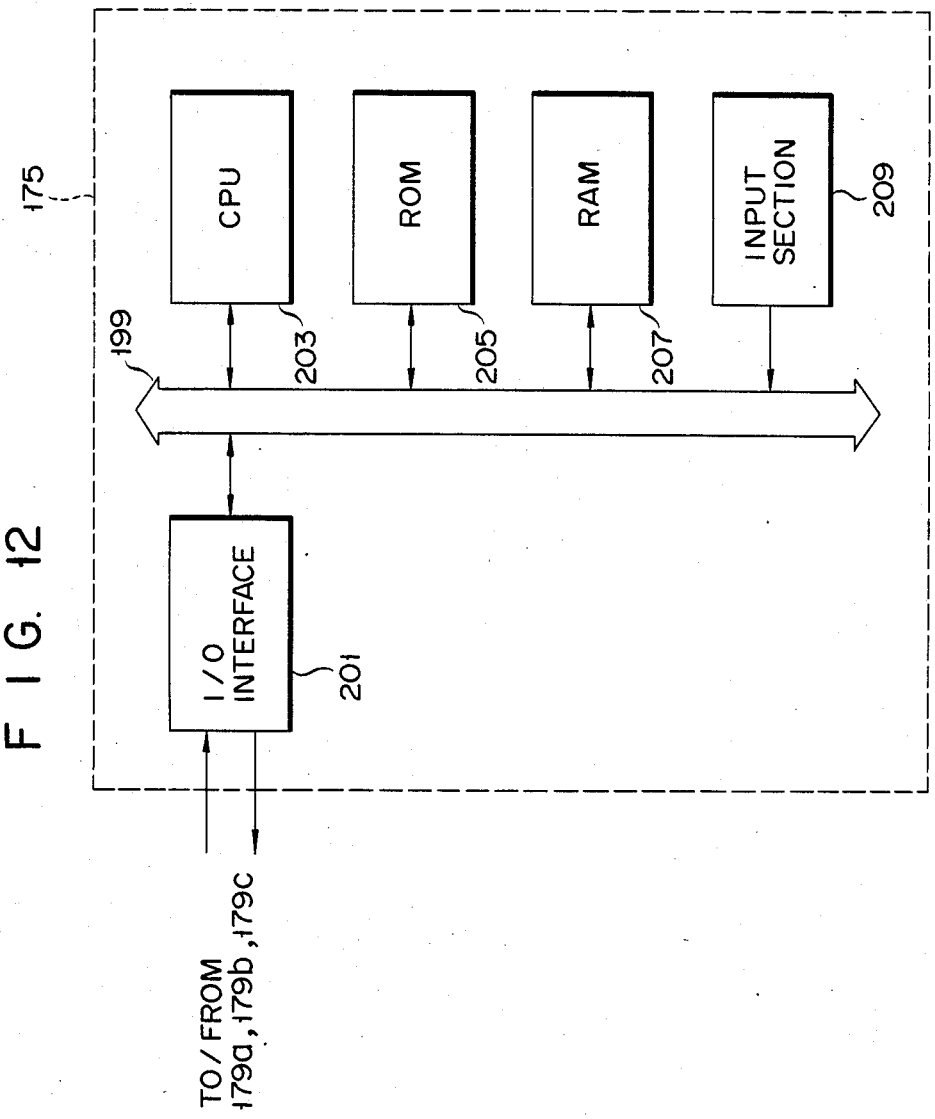
FIG. 12 is a detailed block diagram of the controller shown in FIG. 11.

The controller 175, the waiting stations 171a and 171b, and the calling devices 179a, 179b and 179c will be described in detail with reference to FIGS. 12 through 15F. FIG. 12 shows the arrangement of the controller 175. An I/O interface 201 for exchanging signals between the waiting stations 171a and 171b and the calling stations 179a, 179b and 179c, a CPU 203 for performing various control operations, a ROM 205 for storing a control program, a RAM 207 for storing setting data and external data supplied through the I/O interface 201, and an input section 209 for entering input data are connected to a bus line 199. Four types of control data shown in FIGS. 15A through 15D are used in the controller 175. FIG. 15A shows the control data used for inquiry of the states of the calling devices 179a, 179b and 179c. This control data comprises a header 247, a calling device designation code 249, a calling inquiry code 251 and an end code 253. FIG. 15B shows the control data used for a cancel inquiry for the calling devices 179a, 179b and 179c. This control data comprises a header 255, a calling device designation code 257, a cancel inquiry code 259 and an end code 261. FIG. 15C shows the control data used for an inquiry for the waiting stations 171a and 171b. This control data comprises a header 263, a station designation code 265, a wait inquiry code 267 and an end code 269. FIG. 15D shows the control code used for destination designation of the mobile robots 173a and 173b. This control data comprises a header 271, a station designation code 273, a destination code 275 and an end code 277.

Figure 13:
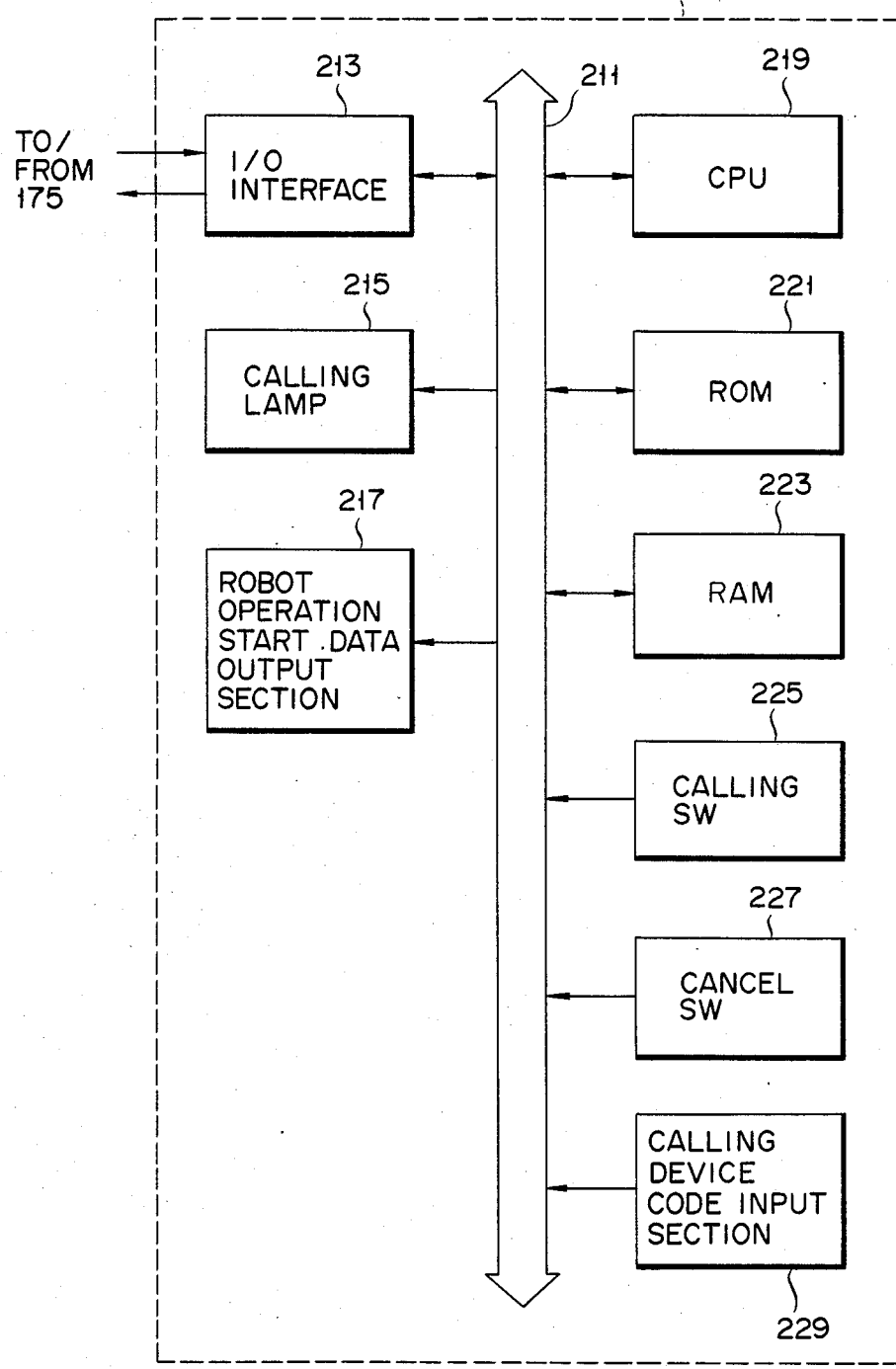
FIG. 13 is a detailed block diagram of the calling device shown in,, FIG. 11.
Figure 16:
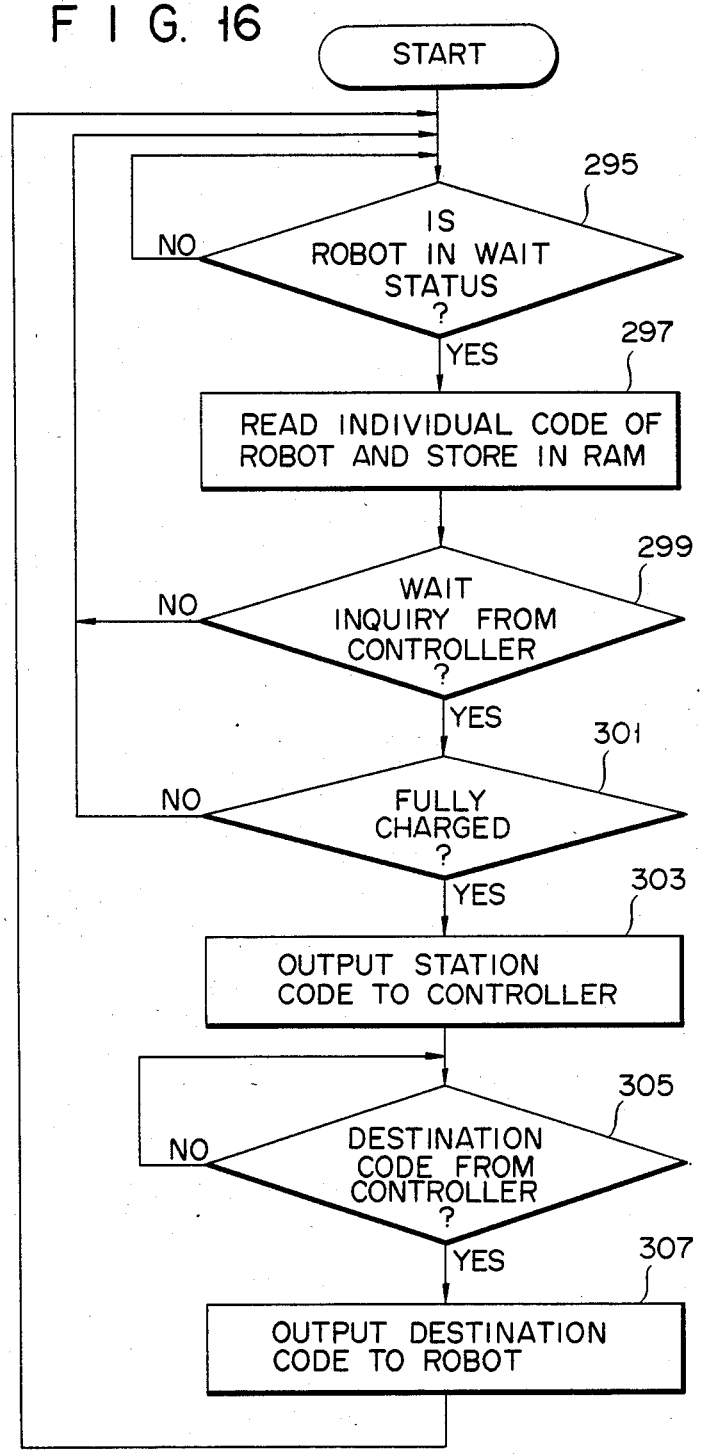
FIG. 16 is a flow chart for explaining the operation of the waiting station.

FIG. 13 shows the configuration of the calling devices 179a, 179b and 179c. A bus line 211 is connected to an I/O interface 213 for exchanging signals with the controller 175, a calling lamp 215 for indicating that the mobile robot is called, a robot operation start data output section 217 for supplying an answerback signal to the caller, a central processing unit (CPU) 219, a read only memory (ROM) 221 for storing a control program, a random access memory (RAM) 223 for storing the control data, a calling switch 225 for calling the mobile robots 173a and 173b, a cancel switch 227 for cancelling calling of the mobile robots 173a and 173b, and a calling device code input section 229 for entering an identification code of each calling device.

The I/O interface 213 exchanges signals with the controller 175. The calling switch 225 includes a robot designation switch (e.g., a switch for designating a desired robot when the respective robots have different functions), a reservation time switch for designating a specific time at which the robot arrives, and a calling position designation switch to cause the robot not to go to the calling device 179a but to position No. 3 although the calling device 179a in FIG. 10 is used. The control data shown in FIG. 15E is used in the calling devices 179a, 179b and 179c. The control data is generated for the calling code to be supplied to the controller 175. This control data comprises a header 279, an individual device code 281, a calling signal presence code or a function code 283, a reservation time code 284, and an end code 285. The function code is formatted to discriminate the functions of the waiting robots when the robots have different functions such as document transportation or tea serving. However, when the single robot is used, or when a plurality of robots have the same function, the specification of the function code is not necessary.

FIG. 14 shows the arrangement of the robot waiting station 171a or 171b. A bus line 231 is connected to an I/O interface 233 for exchanging signals with the controller 175, a robot wait signal designation signal I/O interface 235 for supplying a control command to the mobile robot, a charging circuit 237, a central processing unit (CPU) 239 for controlling the respective units connected thereto, a read only memory (ROM) 241 for storing a control program, a random access memory (RAM) 243 for storing control data and a code input section 245 for entering an identification code of each waiting station. The I/O interface 233 exchanges signals with the controller 175. The I/O interface 235 supplies a control command to the mobile robots 173a and 173b. The charging circuit 237 rectifies an AC power supply voltage supplied from the indoor AC wiring 193 through AC receptacles 181 and 183 to a DC voltage to charge the mobile robot 173a or 173b while the mobile robot 173a or 173b is kept waiting. The waiting stations 171a and 171b supply control data shown in FIG. 15F to the controller 175. The control data comprises a header 287, an individual station code 289, a robot No. code function code 291 and an end code 293. It is noted that the robot No. be specified when a single robot is used or when a plurality of robots have the same function, and the function code be specified when a plurality of robots have different functions.

The operation of the system in the above embodiment will be described in detail with reference to the flow charts in FIGS. 16 through 19D. The operation of the waiting stations 171a and 171b will first be described with reference to the flow chart in FIGS. 17A and 17B. The mobile robots 173a and 173b are normally waiting at the waiting stations 171a and 171b, respectively. The mobile robots 173a and 173b in the wait status are connected to the waiting stations 171a and 171b through the DC power supply lines 195a and 195b and the signal lines 197a and 197b, while the batteries of the mobile robots 173a and 173b are being charged, respectively. When the waiting stations 171a and 171b are held in the operative mode, in step 295, the waiting stations 171a and 171b check whether the mobile robot 173a or 173b is held in the wait status. If NO in step 295, no operation is performed until the mobile robots 173a and 173b return to the home positions. When the mobile robots 173a and 173b return to the home positions and are held in the wait status, the waiting stations 171a and 171b fetch individual codes of the mobile robots 173a and 173b, as shown in step 297. These individual codes are stored in a RAM 243. The waiting stations 171a and 171b check in step 299 whether a wait status inquiry is received from the controller 175. If NO in step 299, the flow returns to step 295. However, if YES in step 299, the charging states of the robots are checked in step 301. When the batteries 296 are not sufficiently charged, the flow returns to step 295. The mobile robots 173a and 173b are held in the wait status until their batteries 296 are sufficiently charged, respectively. However, when it is discriminated in step 301 that the batteries 296 are sufficiently charged, the flow advances to step 303. In step 303, the waiting stations 171a and 171b supply their own station codes to the controller 175 and are held in the wait status in step 305 until destination designation data is answered back from the controller 175. When the destination designation data is supplied from the controller 175 to the waiting stations 171a and 171b, these stations supply destination codes to the mobile robots 173a and 173b in the wait status in step 307, and the flow returns to step 295. The mobile robots 173a and 173b are then moved to the destinations designated by the destination codes, respectively.

Figure 17A:
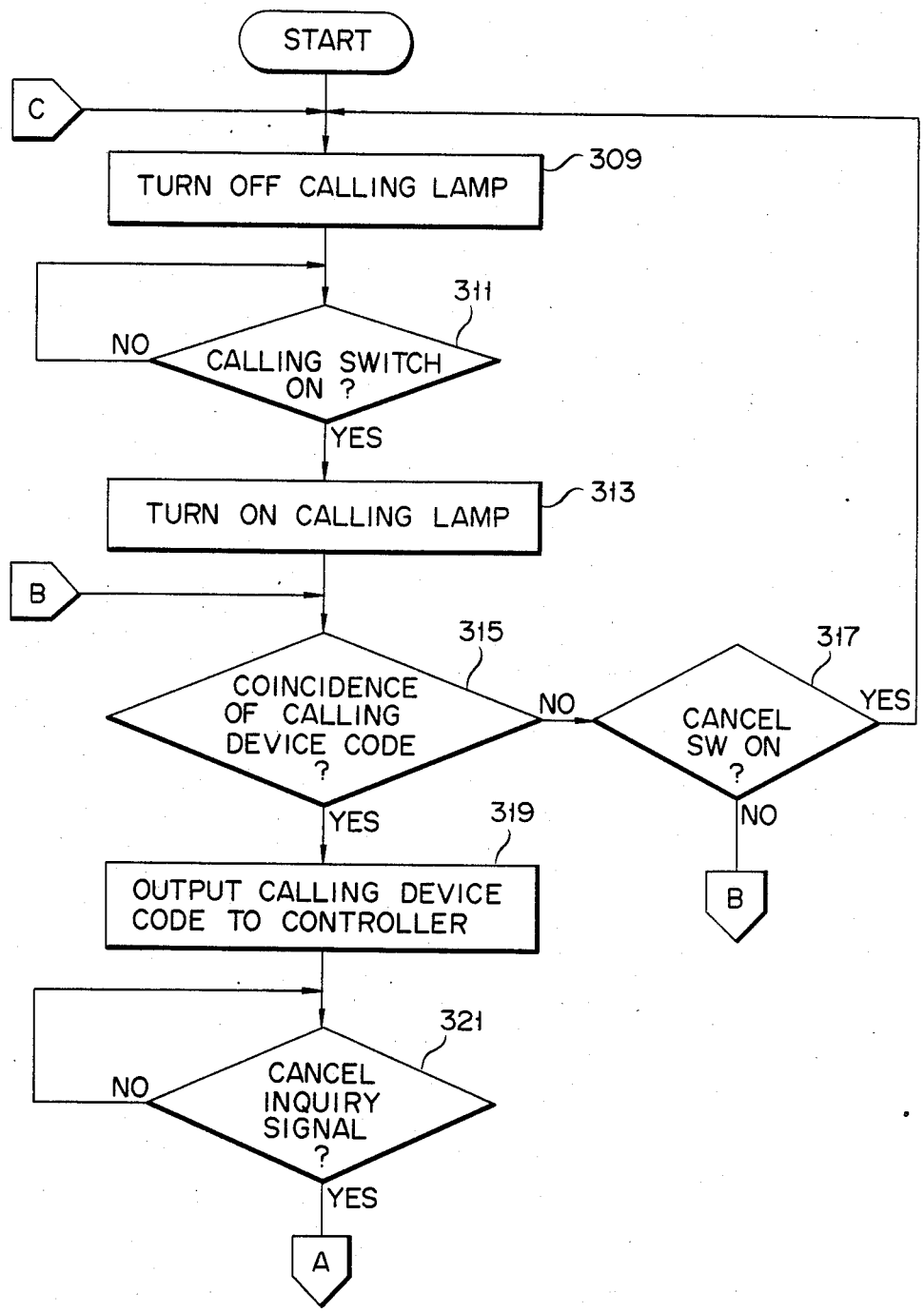
FIGS. 17A and 17B are respectively flow charts for explaining the operation of the calling device.
Figure 17B:
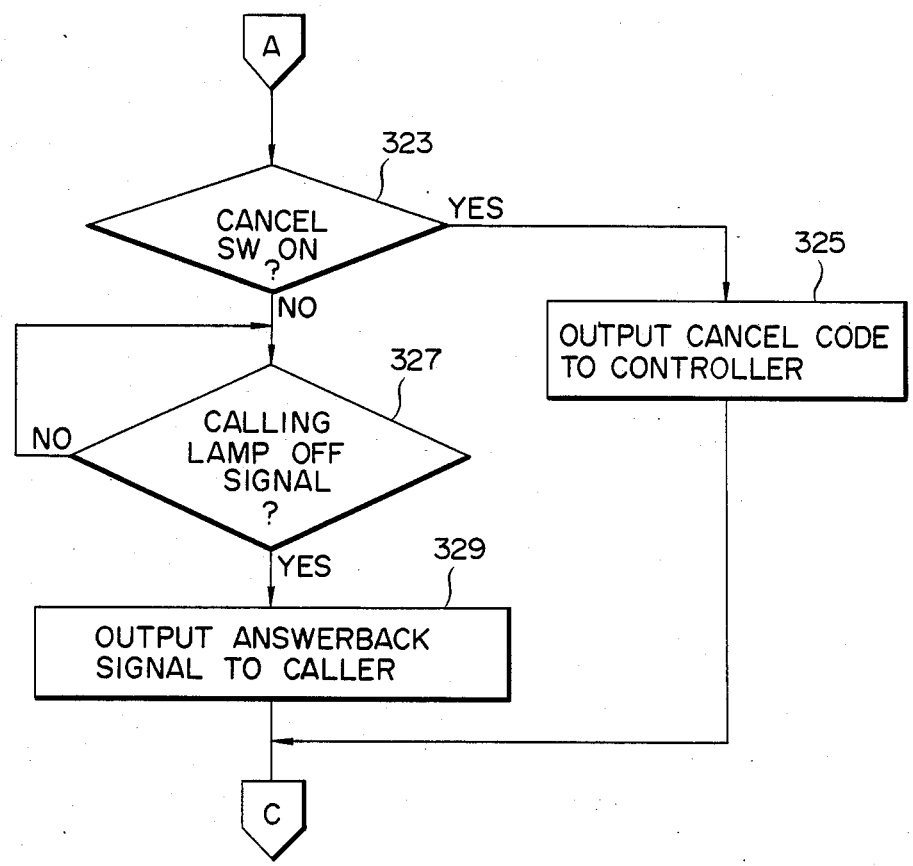
Figure 18A:
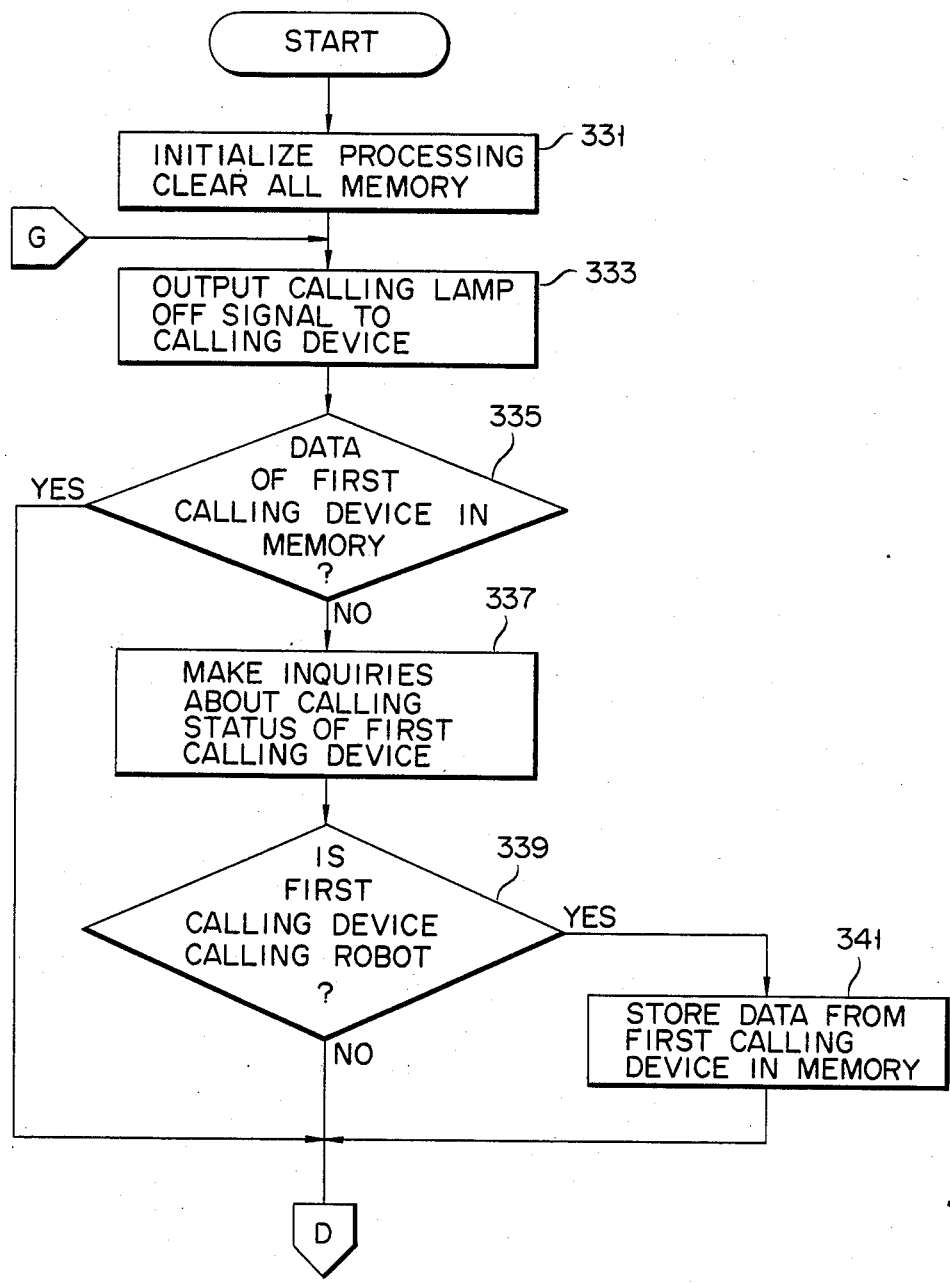
FIGS. 18A through 18D are respectively flow charts for explaining the operation of the controller.
Figure 18B:
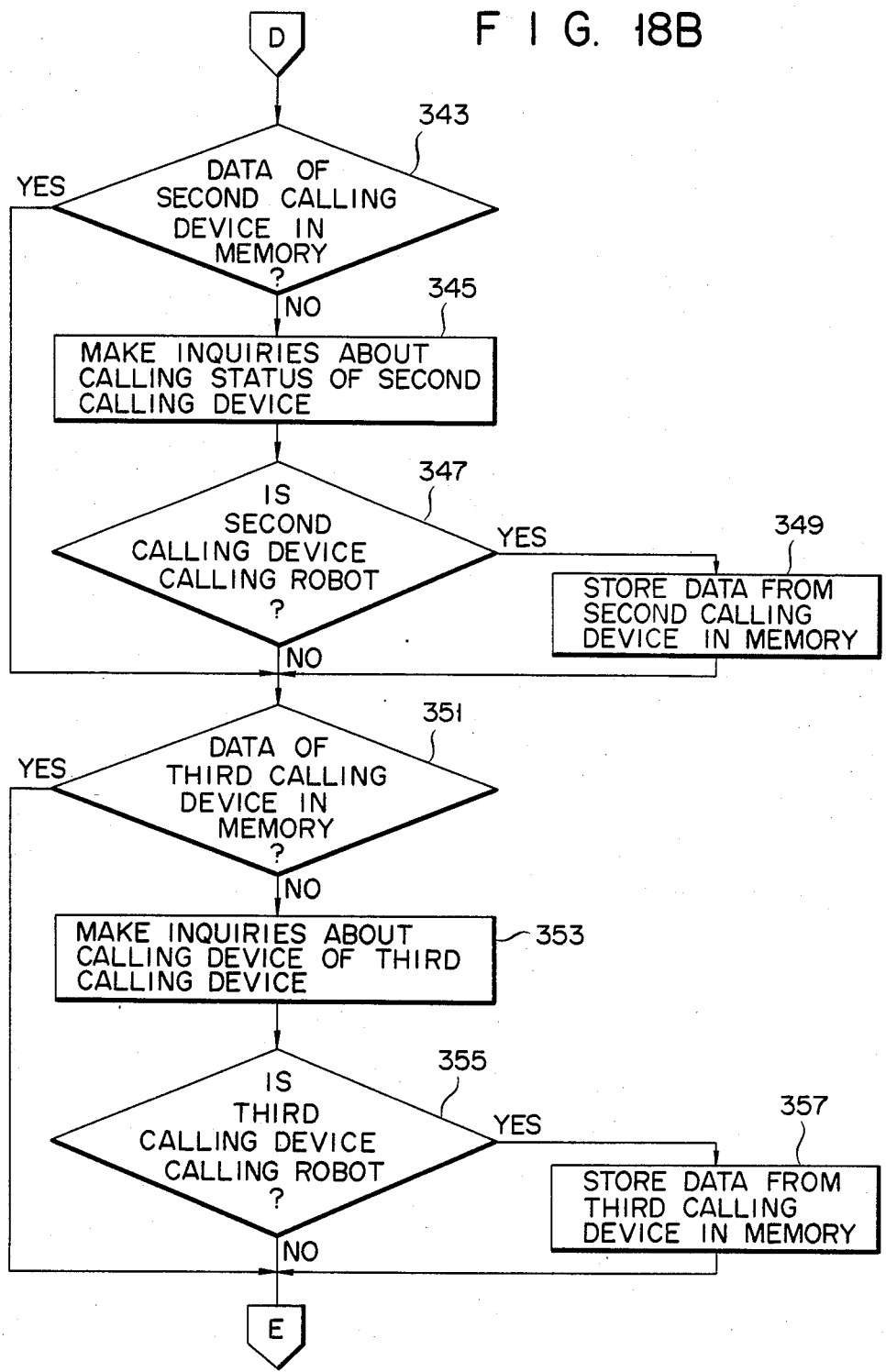
Figure 18C:
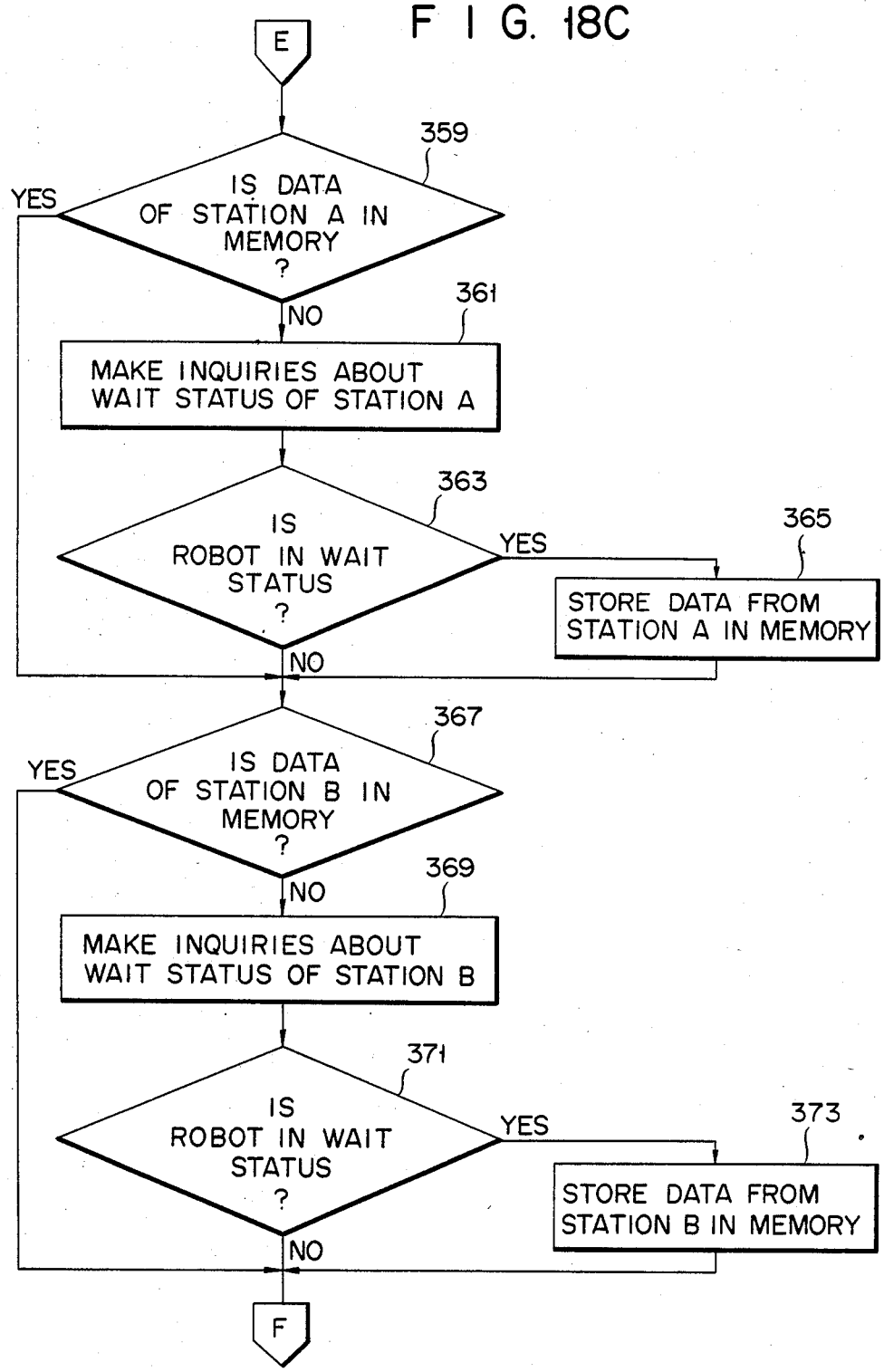
Figure 18D:
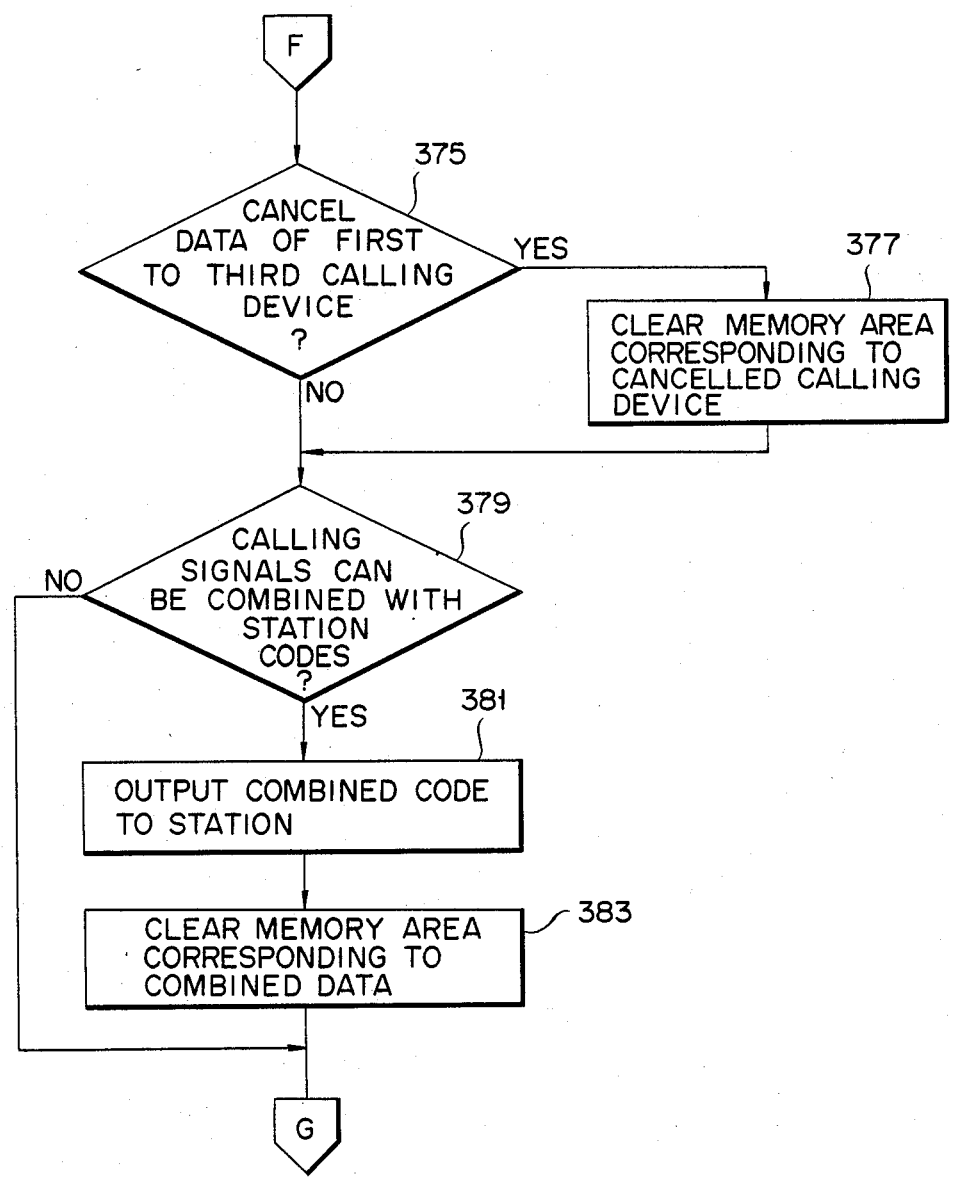

The operation of the calling devices 179a, 179b and 179c will be described with reference to the flow charts in FIGS. 17A and 17B. When the calling devices 179a, 179b and 179c are set in the operative state, the corresponding calling lamps 215 are turned off in step 309. The flow advances to step 311 to check whether the calling switches 225 are turned on. If NO in step 311, step 311 is executed again. However, if YES in step 311, the flow advances to step 313 to turn on the calling lamps 215. At the same time, step 315 is executed to check whether the calling code in the calling device code input section 229 coincides with the inquiry signal from the controller 175. If NO in step 315, the flow advances to step 317 to check whether the cancel switch 227 is turned on. If YES in step 317, the flow returns to step 309. However, if NO in step 317, the flow returns to step 315 to continue looping until the input code coincides with the inquiry signal from the controller 175. When the inquiry signal from the controller 175 coincides with the calling device code, the flow advances from step 315 to step 319, and the calling code is supplied to the controller 175. Thereafter, step 321 is looped until the cancel inquiry signal is supplied from the controller 175. In this state, when the cancel inquiry signal is supplied from the controller 175, the flow advances to step 323 to check whether the cancel switch 227 is turned on. If YES in step 323, a cancel code is supplied to the controller 175 in step 325, and the flow returns to step 309. However, if NO in step 323, the flow advances to step 327, and step 327 is looped until the calling lamp OFF signal is supplied from the controller 175. When the calling lamp OFF signal is supplied from the controller 175, the calling lamps 215 are turned off, and the flow advances to step 329 to signal an audio or visual representation as an answerback signal (e.g., "I am coming") to the caller. Thereafter, the flow returns to step 309.

The operation of the controller 175 will be described with reference to FIGS. 18A through 18D. When the controller 175 is started, initialization is performed in step 331 to clear all storage contents of the RAM 207. In step 333, the lamp OFF signal is supplied to the calling devices 179a, 179b and 179c. The controller 175 then checks in step 335 whether the data concerning the first calling device 179a is stored in the RAM 207. If NO in step 335, the calling state inquiry is supplied to the calling device 179a in step 337. The controller 175 then checks in step 339 whether the calling device 179a calls the mobile robot. If YES in step 339, the flow advances to step 341 wherein the data from the first calling device 179a is fetched by the controller 175 and is stored in the RAM 207. Thereafter, the flow advances to step 343. In step 335, when the controller 175 determines that the data concerning the first calling device 179a is stored in the RAM 207, the flow advances to step 343 even if the controller 175 has determined in step 339 that the calling device 179a is not calling the robot. The controller 175 checks in step 343 whether the data concerning the second calling device 179b is stored. If NO in step 343, the calling state inquiry is supplied to the second calling device 179b in step 345, and the controller 175 checks in step 347 whether the second calling device 179b calls the mobile robot. However, if YES in step 347, the data is fetched from the second calling device 179b to the controller 175 in step 349, and is then stored in the RAM 207. Thereafter, the flow advances to step 351. When the controller 175 determines in step 343 that the data concerning the second calling device 179b is stored in the RAM 207 and in step 347 that the second calling device 179b does not call the mobile robot, the flow advances to step 351. The controller 175 checks in step 351 whether data concerning the third calling device 179c is stored in the RAM 207. If NO in step 351, a calling state inquiry is supplied to the third calling device 179c in step 353. The controller 175 then checks in step 355 whether the third calling device 179c calls the mobile robot and whether the data is stored in the RAM 207. If the controller 175 determines that the data is stored in the RAM 207, the controller 175 fetches the data from the third calling device 179c in step 357. The fetched data is stored in the RAM 207, and then the flow advances to step 359. When the controller 175 determines in step 351 that the data concerning the third calling device 179c is stored in the RAM 207, or when the controller 175 determines in step 355 that the third calling device 179c does not call the mobile robot, the flow advances to step 359. The controller 175 checks in step 359 whether data concerning the waiting station 171a is stored in the RAM 207. If NO in step 359, a robot wait status inquiry is supplied to the waiting station 171a in step 361 so as to check in step 363 whether the mobile robot 173a or 173b is held in the wait status.

If YES in step 363, the data from the waiting station 171a is fetched by the controller 175 and is stored in the RAM 207 in step 365. Thereafter, the flow advances to step 367. However, if YES in step 359 or NO in step 363, the flow advances to step 367. The controller 175 checks in step 367 whether data concerning the waiting station 171b is stored in the RAM 207. If NO in step 367, a robot wait status inquiry is supplied to the waiting station 171b in step 369. The controller 175 then checks in step 371 whether the mobile robot 173b or 173a is held in the wait status. If YES in step 371, the controller 175 fetches the data from the waiting station 171b and the data are stored in the RAM 207 in step 373. Thereafter, the flow advances to step 375. When the controller 175 determines in step 367 that the data concerning the waiting station 171b is stored in the RAM 207, or when the controller 175 determines in step 371 that the mobile robot 173a is not held in the wait status, the flow advances to step 375. The controller 175 checks in step 375 the presence/absence of the cancel data in the first to third calling devices 179a, 179b and 179c. If the controller 175 determines that the cancel data is stored in the first to third calling devices 179a, 179b and 179c, the flow advances to step 377. The contents of the RAMs 207 in the calling devices which have the cancel data are cleared. When the operation in step 377 is completed, or the cancel data cannot be detected in step 375, the flow advances to step 379. The controller 175 checks in step 379 whether the calling signals from the first to third calling devices 179a, 179b and 179c can be combined with the station codes of the waiting stations 171a and 171b. If YES in step 379, the combined codes are supplied to the station 171a or 171b in step 381. Thereafter, the flow advances to step 383, and the contents of the RAMs 207 which are concerned with the combinations of the calling devices 179a, 179b and 179c and the waiting stations 171a and 171b are cleared, and the flow returns to step 333. However, if NO in step 379, the flow directly returns to step 333. In step 333, the controller 175 supplies the lamp OFF signal to the calling lamps 215 of the calling devices 179a, 179b and 179c whose ROMs are cleared. The same operation as described above will be repeated.

The controller 175 thus constantly checks the robot calling states of the calling devices 179a, 179b and 179c and the robot wait status of the waiting stations 171a and 171b. The controller 175 supplies a control command to the waiting stations 171a and 171b in accordance with the calling signals from the calling devices 179a, 179b and 179c. The waiting stations 171a and 171b supply the destination codes to the mobile robots 173a and 173b in accordance with the control command from the controller 175. The mobile robots 173a and 173b are moved to the calling devices 179a, 179b and 179c or other designated positions in accordance with the destination codes from the controller 175. The mobile robots 173a and 173b receive new commands at the destinations and are operated in accordance with the new commands. Thereafter, the mobile robots 173a and 173b return to the waiting stations 171a and 171b, respectively. In this manner, when the mobile robots 173a and 173b are moved to the designated positions, respectively, their routes can be calculated in accordance with the data stored in the memories in the mobile robots 173a and 173b or controlled by the controller 175 in accordance with the operation of other robots.

Even if all the robots or a requested robot is out when the calling devices 179a, 179b and 179c call the mobile robots 173a and 173b, the controller 175 cyclically monitors the wait status of the robots. If the mobile robots 173a and 173b return to the corresponding stations and are sufficiently charged, the OK signal is generated from the waiting stations 171a and 171b. In the following step, the destination data is generated from the controller 175, thereby immediately moving the mobile robots 173a and 173b.

The mobile robots 173a and 173b can be called with time reservations by the calling devices 179a, 179b and 179c.

When the waiting mobile robots 173a and 173b have different functions such as document or item carry functions, a tea serving function, and a copy only function, the corresponding function switches are arranged in each calling device. In this case, the calling data may be concentrated in the controller and can be distributed and managed thereby.

What is claimed is:

1. A mobile robot system, comprising:
   a plurality of robot waiting stations, adapted to be connected to alternating-current power supply wiring, each of said plurality of robot waiting stations including means for exchanging a waiting signal and a calling signal with an associated robot when the corresponding robot remains at a home position at said waiting station, and each of said plurality of robot waiting stations having a unique station-identification code;
   a plurality of mobile robots, each arranged for waiting at said home position at the corresponding waiting station, and including means for providing respective robot-waiting signals to the corresponding waiting stations, and means for receiving corresponding robot calling signals via said waiting stations;
   a plurality of calling devices, each calling device including means for generating a corresponding calling signal including a unique device-identification code to be received by a selected one of said plurality of mobile robots; and
   a controller coupled to each of said calling devices and the said waiting stations, for cyclically checking the robot-calling state of each of said plurality of calling devices, by using each of said unique station-identification codes, and for cyclically checking the robot-waiting status of said plurality of mobile robots at said waiting stations, by using each of said unique device-identification code, and including means for generating the robot-calling signal to a designated one of said waiting stations, in accordance with the robot-waiting signal in said designated waiting station when the robot-calling signal is generated from one of said calling devices, thereby instructing the corresponding one of the plurality of mobile robots to come to said one of said calling devices.

2. A system according to claim 1, wherein each of said waiting stations comprising a signal receiver and an electrical charging device, said mobile robot in the waiting state being electrically charged by said charging device.

3. A system according to claim 1, wherein said controller comprises:
   input/output means for exchanging signals between said waiting stations and said calling devices;
   central processing unit means for controlling components connected thereto;

first memory means coupled to said central processing unit means for storing a control program;
second memory means coupled to said central processing unit means for receiving setting data and external data supplied through said input/output means; and
input means for entering the setting data.

4. A system according to claim 1, wherein each of said calling devices comprises:
an input/output interface means for exchanging signals with said controller;
robot operation-start data output means for supplying an answerback signal, which represents the starting of operation of the designated mobile robot, to a caller:
central processing unit means for controlling respective components connected thereto;
first memory means coupled to said central processing unit means for storing a control program;
second memory means coupled to said central processing unit means for storing control data;
a calling switch for calling one of said plurality of mobile robots;
a cancel switch for cancelling calling of said one of said plruality of mobile robots; and
a calling device code setting section for setting said unique device identication code of the calling device.

5. A system according to claim 1, wherein each of said waiting stations comprises:
input/output means for exchanging signals with said controller;
robot wait signal and destination signal input/output means for supplying a control command to said mobile robot;
central processing unit means for controlling respective components connected thereto;
first memory means coupled to said central processing unit means for storing a control program;
second memory means coupled to said central processing unit means for storing control data; and
waiting station code setting means for setting said unique station identification code of the waiting station.

6. A mobile robot system, comprising:
alternating current power supply wiring for supplying alternating current power from an outside AC voltage source;
robot calling signal generating means for generating a robot calling signal;
superposing means adapted to be coupled to said power supply wiring, for superposing the robot calling signal from said robot calling signal generating means on an alternating current power supply voltage applied to said power supply wiring by said AC voltage source; and
a mobile robot adapted to be connected to said alternating current power supply wiring so as to receive the robot calling signal supplied through said power supply wiring, for performing a predetermined operation;
wherein said mobile robot comprises:
a power supply;
demodulating means for receiving the supplied robot calling signal superposed on said alternating current power supply voltage, and for demodulating the robot calling signal;
a robot computing block for performing a predetermined operation; and
charging means for charging said power supply of said mobile robot;
and wherein said demodulating means comprises:
a high frequency transformer for extracting the superposed robot calling signal from said alternating current power supply wiring;
a filter for eliminating a harmonic component of an output signal from said high frequency transformer;
a phase locked loop circuit for receiving an output signal from said filter to generate a phase-locked frequency-modulated signal;
comparing means for receiving the output signal from said filter and for comparing the signal from said filter with a reference signal to produce a predetermined pulse; and
a gate for performing a logical AND operation of the pulse from said comparing means and the frequency-modulated signal generated from said phase-locked loop circuit.

7. A system according to claim 6, wherein said robot calling signal generating means comprises:
a calling switch;
an identification code generator for generating an identification code of said robot calling signal generating means;
a decoder, connected to said calling switch and said identification code generator, for decoding the identification code in accordance with a signal from said calling switch and for generating a plurality of signals after the decoding; and
a phase locked loop circuit for generating a frequency-modulated signal which is phase-locked with an output signal from said decoder.

8. A system according to claim 6, wherein said robot computing block comprises:
a servo control microcomputer; and
a main microcomputer, responsive to a signal from said demodulating means, for supplying control data to said servo control microcomputer.

9. A system according to claim 8, further comprising:
an input device connected to said main microcomputer and having a route map data input key, a destination designation key, a start key and a home position return switch; and
a direction discrimination sensor, connected to said main microcomputer, for detecting a moving direction of said mobile robot.

10. A mobile robot system, comprising:
alternating current power supply wiring for supplying alternating current power from an outside AC voltage source;
robot calling signal generating means for generating a robot calling signal;
superposing means adapted to be coupled to said power supply wiring for superposing the robot calling signal from said robot calling signal generating means on an alternating current power supply voltage applied to said power supply wiring by said AC voltage source;
relay transmitting means, including an antenna and adapted to be connected to said alternating current power supply wiring, for relaying the robot calling signal from said robot calling signal generating means and transmitting the robot calling signal to said mobile robot through said antenna; and a mobile robot, including receiving means, for receiving the robot calling signal relayed by said relay transmitting means and for performing a predetermined operation;

wherein said relay transmitting means comprises;

a high frequency transformer for extracting the superposed robot calling signal from said alternating current power supply wiring;

a filter for eliminating a harmonic component of an output signal from said high frequency transformer;

a phase-locked loop circuit for receiving an output signal from said filter to generate a phase-locked frequency-modulated signal;

comparing means for receiving the output signal from said filter and comparing the signal from said filter with a reference signal to produce a predetermined pulse;

a gate for performing a logical AND operation of the pulse from said comparing means and the frequency-modulated signal generated from said phase-locked loop circuit; and a transmitter for transmitting an output signal from said gate to said mobile robot.

11. A system according to claim 10, wherein said robot calling signal generating means comprises:

a calling switch;

an identification code generator for generating an identification code of said robot calling signal generating means;

a decoder, connected to said calling switch and said identification code generator, for decoding the identification code in accordance with a signal from said calling switch and for generating a plurality of signals after the decoding; and a phase locked loop circuit for generating a frequency-modulated signal which is phase-locked with an output signal from said decoder.

12. A system according to claim 10, including a plurality of said relay transmitting means so as to cover a predetermined space.

* * * * *